US010249183B2

(12) United States Patent
Umehara et al.

(10) Patent No.: US 10,249,183 B2
(45) Date of Patent: Apr. 2, 2019

(54) TRAFFIC INDEX GENERATION DEVICE, TRAFFIC INDEX GENERATION METHOD, AND COMPUTER PROGRAM

(71) Applicant: SUMITOMO ELECTRIC INDUSTRIES, LTD., Osaka-shi, Osaka (JP)

(72) Inventors: Shigeki Umehara, Osaka (JP); Hiroshi Matsumoto, Osaka (JP); Masafumi Kobayashi, Osaka (JP); Osamu Hattori, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/535,553

(22) PCT Filed: Feb. 19, 2016

(86) PCT No.: PCT/JP2016/054863
§ 371 (c)(1),
(2) Date: Jun. 13, 2017

(87) PCT Pub. No.: WO2016/136616
PCT Pub. Date: Sep. 1, 2016

(65) Prior Publication Data

US 2017/0352263 A1 Dec. 7, 2017

(30) Foreign Application Priority Data

Feb. 23, 2015 (JP) ................................ 2015-033226
Mar. 20, 2015 (WO) .................. PCT/JP2015/058492

(51) Int. Cl.
*G08G 1/01* (2006.01)
*G01S 19/13* (2010.01)

(52) U.S. Cl.
CPC ......... *G08G 1/0133* (2013.01); *G08G 1/0112* (2013.01); *G08G 1/0145* (2013.01)

(58) Field of Classification Search
CPC ........ G08G 1/01; G08G 1/0133; G08G 1/095; G08G 1/052; G01C 21/28; G01C 21/26; G01C 21/30; G01S 19/13
(Continued)

(56) References Cited

U.S. PATENT DOCUMENTS 6,326,903 B1 12/2001 Gross et al.
6,339,383 B1 * 1/2002 Kobayashi ............... G08G 1/08 340/907
(Continued)

FOREIGN PATENT DOCUMENTS

JP 2002-024989 A 1/2002
JP 2002-230686 A 8/2002
(Continued)

OTHER PUBLICATIONS

U.S. Office Action dated Dec. 27, 2017 in U.S. Appl. No. 15/531,868.
(Continued)

*Primary Examiner* — Tan Q Nguyen
(74) *Attorney, Agent, or Firm* — Drinker Biddle & Reath LLP

(57) ABSTRACT

The present invention relates to a device (roadside relay device 2) configured to generate a traffic index used for traffic signal control. This device includes: a storage unit 24 configured to store therein area information on a coordinate system, the area information forming a predetermined area on a road; a communication unit 21 configured to receive probe information S5 including a vehicle position and temporal information of a traveling vehicle 5; and a control unit 23 configured to generate the traffic index on the basis of the area information and the probe information S5.

17 Claims, 19 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2002/0116118 | A1* | 8/2002 | Stallard | G08G 1/01 701/117 |
| 2004/0145497 | A1 | 7/2004 | Pearson | |
| 2004/0246144 | A1 | 12/2004 | Siegel et al. | |
| 2007/0040700 | A1 | 2/2007 | Bachelder | |
| 2010/0153002 | A1 | 6/2010 | Lee et al. | |
| 2011/0191011 | A1 | 8/2011 | McBride et al. | |
| 2012/0033123 | A1* | 2/2012 | Inoue | G08G 1/04 348/333.13 |
| 2012/0188099 | A1* | 7/2012 | Lee | G08G 1/087 340/906 |
| 2014/0372561 | A1 | 12/2014 | Hisano | |
| 2015/0243165 | A1 | 8/2015 | Elsheemy | |
| 2015/0269840 | A1* | 9/2015 | Hirata | G08G 1/0129 701/118 |
| 2016/0169688 | A1 | 6/2016 | Kweon et al. | |
| 2016/0171884 | A1* | 6/2016 | Chen | G08G 1/0112 701/117 |
| 2017/0372148 | A1* | 12/2017 | Chen | G06K 9/00791 |

FOREIGN PATENT DOCUMENTS

| | | | |
|---|---|---|---|
| JP | 2003-187379 | A | 7/2003 |
| JP | 2006-215977 | A | 8/2006 |
| JP | 2009-048406 | A | 3/2009 |
| JP | 2009-69907 | A | 4/2009 |
| JP | 2009-140110 | A | 6/2009 |
| JP | 2010-250586 | A | 11/2010 |
| JP | 2011-96146 | A | 5/2011 |
| JP | 2011-159152 | A | 8/2011 |
| JP | 2011-233027 | A | 11/2011 |
| JP | 2012-155553 | A | 8/2012 |
| JP | 2013-101571 | A | 5/2013 |
| JP | 2013-175131 | A | 9/2013 |
| JP | 2013-214225 | A | 10/2013 |
| JP | 2014-032545 | A | 2/2014 |
| JP | WO 2014-041826 | A | 3/2014 |
| WO | WO-2012/086301 | A1 | 6/2012 |

OTHER PUBLICATIONS

U.S. Appl. No. 15/531,868, filed May 31, 2017, Shigeki Umehara.
U.S. Notice of Allowance dated May 7, 2018 that issued in co-pending U.S. Appl. No. 15/531,868.
U.S. Notice of Allowance dated Aug. 15, 2018 that issued in U.S. Appl. No. 15/531,868.
U.S. Notice of Allowance dated Dec. 18, 2018 that issued in U.S. Appl. No. 15/531,868.

* cited by examiner

[IMAGINARY AREA USED FOR TRAFFIC VOLUME CALCULATION PROCESS]

[IMAGINARY AREA USED FOR TRAVEL TIME CALCULATION PROCESS]

[IMAGINARY PULSE SIGNAL GENERATION PROCESS]

[IMAGINARY AREA USED FOR BRANCHING RATE CALCULATION PROCESS]

[IMAGINARY AREA CORRESPONDING TO MULTIPLE APPROACH PATHS]

[OUTLINE OF DETECTOR EMULATION]

TRAFFIC INDEX GENERATION DEVICE, TRAFFIC INDEX GENERATION METHOD, AND COMPUTER PROGRAM

TECHNICAL FIELD

The present invention relates to a traffic index generation device, a traffic index generation method, and a computer program. More specifically, the present invention relates to a method for generating a traffic index on the basis of probe information, and an imaginary area corresponding to a detection area of a vehicle detector.

BACKGROUND ART

A traffic control system includes: for example, a central apparatus located in a traffic control center; and traffic signal controllers, vehicle detectors, information boards, traffic monitor terminals, and the like which communicate with the central apparatus via dedicated communication lines (refer to Patent Literature 1, for example).

In such a traffic control system, predetermined traffic indices are calculated on the basis of, for example, detection signals from vehicle detectors installed at appropriate locations in an area to be controlled, and traffic-actuated control, such as setting of optimum traffic light switching timings for a plurality of intersections, is performed on the basis of the calculated traffic indices.

As a vehicle detector for collecting data used for traffic signal control, a non-image-processing vehicle detector represented by an ultrasonic vehicle detector has been known. The non-image-processing vehicle detector performs spot measurement such as counting up the number of passing vehicles (traffic volume) through a relatively narrow detection spot (refer to Patent Literature 2, for example).

Meanwhile, as another vehicle detector for collecting the above data, an image-processing vehicle detector (television camera) has also been known. The image-processing vehicle detector has a photographing range including a relatively long road section, and digitally analyzes a photographed image of a vehicle to measure the speed of the vehicle, and the like (refer to Patent Literature 3, for example).

CITATION LIST

Patent Literature

PATENT LITERATURE 1: Japanese Laid-Open Patent Publication No. 2006-215977

PATENT LITERATURE 2: Japanese Laid-Open Patent Publication No. 2003-187379

PATENT LITERATURE 3: Japanese Laid-Open Patent Publication No. 2013-175131

SUMMARY OF INVENTION

Technical Problem

For example, in order to install an ultrasonic vehicle detector on a road, it is necessary to erect a support strut on each approach path, and mount a detector head, for each lane, to a beam member provided at an upper end of the support strut. This work may result in an increase in costs for installation of support struts and the like, and the ultrasonic vehicle detector may adversely affect the scenery around the intersection.

Further, since the work for installing the support struts needs to be redone when detection points of the installed ultrasonic vehicle detector are adjusted, there is also a problem that it is difficult to adjust the detection points.

In the case of the image-processing vehicle detector, since one image-processing vehicle detector can measure the traffic volumes in a plurality of lanes, the number of vehicle detectors to be installed can be reduced as compared to the case of the ultrasonic vehicle detector. However, the image-processing vehicle detector also needs to be installed on each approach path, which results in almost the same problem as above.

In view of the conventional problems, an object of the present invention is to generate, even when a vehicle detector is not actually installed, traffic indices of the same kinds as those obtained when a vehicle detector is installed, thereby to collect the traffic indices at low costs.

Solution to Problem (1) A traffic index generation device according to one aspect of the present invention is a device configured to generate a traffic index used for traffic signal control, and includes: a storage unit configured to store therein area information on a coordinate system, the area information forming a predetermined area on a road; a communication unit configured to receive probe information including a vehicle position and temporal information of a traveling vehicle; and a control unit configured to generate the traffic index on the basis of the area information and the probe information.

(16) A computer program according to one aspect of the present invention is a computer program for causing a computer to function as a device configured to generate a traffic index used for traffic signal control, and includes: a step of causing a storage unit of the traffic index generation device to store area information on a coordinate system, the area information forming a predetermined area on a road; a step of causing a communication unit of the traffic index generation device to receive probe information including a vehicle position and temporal information of a traveling vehicle; and a step of causing a control unit of the traffic index generation device to generate the traffic index on the basis of the area information and the probe information.

(17) A traffic index generation method according to one aspect of the present invention is a traffic index generation method executed by a device configured to generate a traffic index used for traffic signal control, and includes: a step of causing a storage unit of the traffic index generation device to store area information on a coordinate system, the area information forming a predetermined area on a road; a step of causing a communication unit of the traffic index generation device to receive probe information including a vehicle position and temporal information of a traveling vehicle; and a step of causing a control unit of the traffic index generation device to generate the traffic index on the basis of the area information and the probe information.

Advantageous Effects of Invention

According to the present invention, even when a vehicle detector is not actually installed, traffic indices of the same kinds as those obtained when a vehicle detector is installed can be generated, whereby the traffic indices can be collected at low costs.

DESCRIPTION OF EMBODIMENTS

<Outline of Embodiment of Present Invention>

Figure 1:
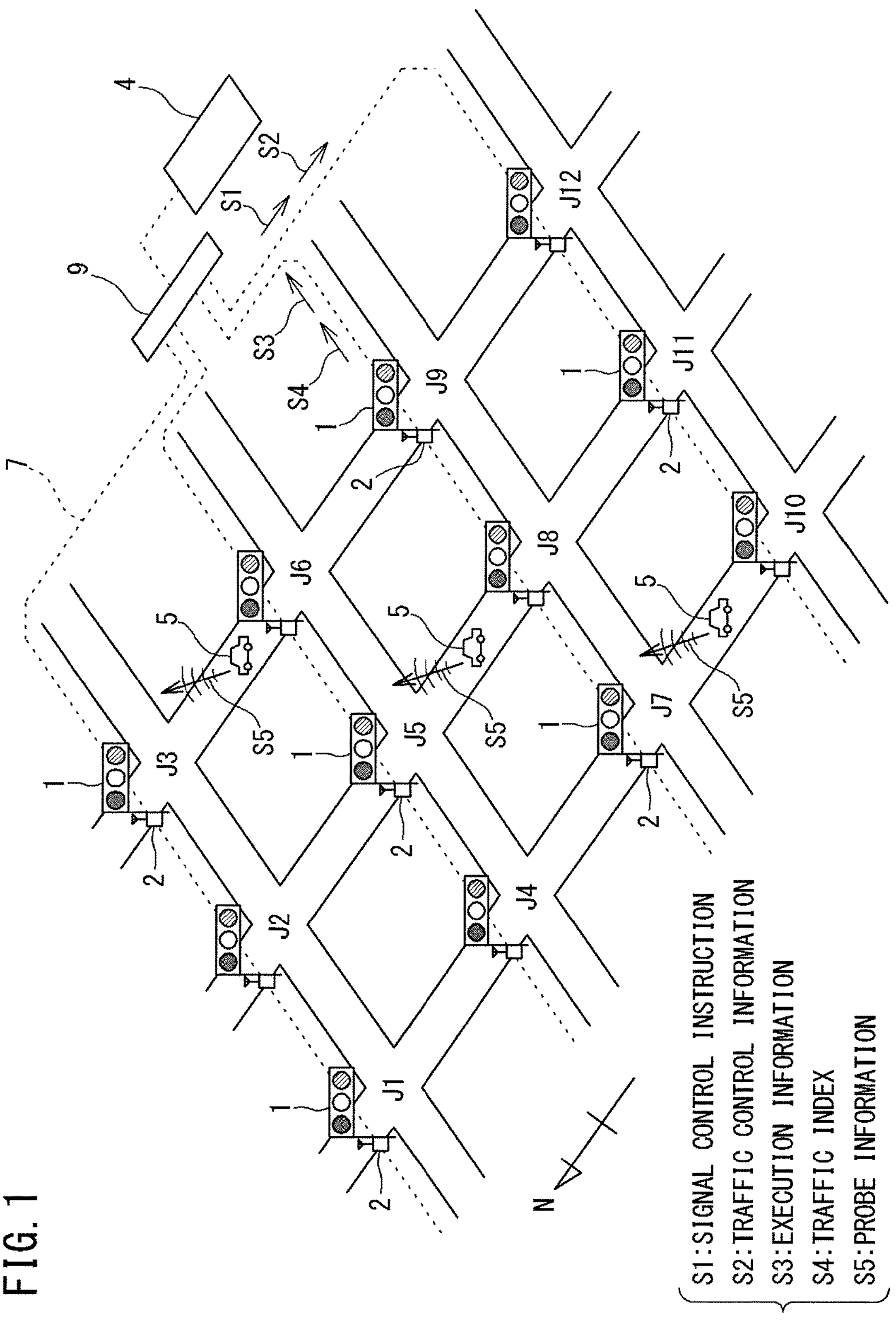
FIG. 1 is a perspective view showing an example of a configuration of a traffic control system according to an embodiment of the present invention.

Hereinafter, the outline of an embodiment of the present invention will be described in a list form.

(1) A traffic index generation device according to the present embodiment is a device configured to generate a traffic index used for traffic signal control, and includes: a storage unit configured to store therein area information on a coordinate system, the area information forming a predetermined area on a road; a communication unit configured to receive probe information including a vehicle position and temporal information of a traveling vehicle; and a control unit configured to generate the traffic index on the basis of the area information and the probe information.

According to the traffic index generation device of the present embodiment, the control unit generates the traffic index on the basis of: the area information on the coordinate system, which is stored in the storage unit and forms the predetermined area on the road; and the probe information received by the communication unit. Therefore, even when a vehicle detector is not actually installed, a traffic index of the same kind as that obtained when a vehicle detector is installed can be generated. Thus, the traffic index can be collected at low costs.

(2) In the traffic index generation device according to the present embodiment, the storage unit preferably stores therein a plurality of pieces of the area information that form a plurality of the predetermined areas located at different positions on the road, respectively, and the control unit preferably generates the traffic index for each of the stored plurality of pieces of the area information.

According to the traffic index generation device of the present embodiment, the control unit generates the traffic index for each of the plurality of the area information that form the plurality of the predetermined areas located at the different positions on the road. Therefore, it is possible to obtain the traffic index for each approach path or each control type by adopting the area information that varies for each approach path (imaginary areas L1 to L4 shown in FIG. 16) or area information that varies for each type of local-actuated control (refer to imaginary areas Q to Z shown in FIG. 15).

Therefore, even when a vehicle detector is not installed for each approach path or each control type, the traffic index required for a desired traffic signal control can be obtained.

(3) For example, in the traffic index generation device according to the present embodiment, in the case where the storage unit stores therein a plurality of pieces of the area information that form a plurality of the predetermined areas on a plurality of approach paths connecting to a single intersection, respectively (refer to imaginary areas L1 to L4 shown in FIG. 16), the traffic index for each of the pieces of the area information, which is generated by the control unit, is a traffic index for each of the approach paths at the intersection.

Thus, since the generated traffic index is transmitted to the external equipment (a central apparatus, a traffic signal controller, or the like), the external equipment is allowed to obtain the traffic index (e.g., traffic volume) for each of the plurality of approach paths only by installing one traffic index generation device.

(4) In the traffic index generation device according to the present embodiment, the traffic index generated by the control unit preferably includes at least one of a traffic volume, an occupancy, and a detection pulse signal of the vehicle in the predetermined area. In this case, it is possible to almost completely emulate a traffic index that the conventional non-image-processing vehicle detector generates.

Accordingly, a roadside device (e.g., a central apparatus) that executes traffic signal control by using a traffic index generated by a non-image-processing vehicle detector can advantageously execute the same traffic signal control by using the traffic index generated by the traffic index generation device, without the necessity of changing a control program.

(5) Further, in the traffic index generation device according to the present embodiment, in the case where the storage unit stores therein the plurality of the area information that form the plurality of the predetermined areas corresponding to different types of local-actuated controls, respectively (refer to imaginary areas Q to Z shown in FIG. 15), the traffic index for each of the plurality of the area information, which is generated by the control unit, is a traffic index for each of the types of the local-actuated controls.

Thus, since the generated traffic index is transmitted to the traffic signal controller, the traffic signal controller is allowed to obtain the traffic index (e.g., detection pulse signal) required for each of the types of the local-actuated controls only by installing one traffic index generation device.

(6) In the traffic index generation device according to the present embodiment, the traffic index generated by the control unit preferably includes at least one of a detection pulse signal in the predetermined area and a vehicle speed in the predetermined area.

In this case, the traffic signal controller can utilize the detection pulse signal or the vehicle speed outputted from the traffic index generation device, for local-actuated control such as gap-actuated control, dilemma-actuated control, high-speed-actuated control, or the like.

(7) In the traffic index generation device according to the present embodiment, in the case where the probe information includes a type of the vehicle, the control unit preferably causes the communication unit to transmit the vehicle type included in the probe information to the traffic signal controller.

In this case, the traffic index outputted from the traffic index generation device can be utilized for local-actuated control that needs the vehicle type, such as bus-actuated control, VIP-actuated control, or the like.

(8) In the traffic index generation device according to the present embodiment, the probe information preferably includes a vehicle heading, and the control unit preferably does not generate the traffic index when an angular difference between the vehicle heading and a road heading exceeds a predetermined value, and generates the traffic index when the angular difference is less than or equal to the predetermined value.

Thus, it is possible to prevent in advance erroneous generation of a traffic index of a probe vehicle estimated to travel on an opposing lane, which may cause the angular difference between the vehicle heading and the road heading to exceed the predetermined value.

(9) In the traffic index generation device according to the present embodiment, an area on the coordinate system, which is specified by the area information, preferably extends two-dimensionally or three-dimensionally.

The reason is as follows. In the case where the area on the coordinate system is a one-dimensional line segment, special processing is required, such as converting an actual vehicle into an imaginary moving object composed a line segment equivalent to the vehicle length including the vehicle position or into an imaginary moving object composed of a line segment connecting the current vehicle position and the previous vehicle position. That is, by adopting the area on the coordinate system, which extends two-dimensionally or three-dimensionally, passing of a vehicle can be detected without executing the above processing, whereby the processing load on the traffic index generation device can be reduced.

In addition, adopting the area on the coordinate system, which extends three-dimensionally, enables discrimination between an elevated road such as a freeway and an ordinary road on a flat land.

Therefore, there is an advantage that a traffic index for at least one of the elevated road and the ordinary road can be generated by using an imaginary space that is set on a road section, of the ordinary road, which overlaps the elevated road directly above the ordinary road.

(10) In the traffic index generation device according to the present embodiment, the communication unit is preferably able to receive the area information from external equipment, and the control unit preferably causes the storage unit to store the area information received by the communication unit.

Thus, the area information can be set in the traffic index generation device by remote control using external equipment (e.g., a terminal device), which facilitates the work for setting the area information.

(11) In the traffic index generation device according to the present embodiment, the communication unit is preferably able to receive the area information from external equipment, and the control unit preferably updates the area information stored in the storage unit, to the area information received by the communication unit.

Thus, the area information set in the traffic index generation device can be updated by remote control using external equipment (e.g., a terminal device), which facilitates the work for updating the area information.

(12) In the traffic index generation device according to the present embodiment, the control unit preferably causes the communication unit to transmit the area information before being updated and the area information after being updated.

Thus, by displaying the area information before being updated and the area information after being updated on a display unit of external equipment (e.g., a terminal device) that has received these pieces of area information, a traffic engineer is allowed to check the adequacy of the updating of the area information.

(13) In the traffic index generation device according to the present embodiment, in the case where the probe information includes at least one of information about a length of the vehicle and information about a type of the vehicle, the control unit preferably executes, by using the information, a process of correcting the position of the vehicle to at least one of a front end position of the vehicle and a rear end position of the vehicle.

Thus, an entry time and an exit time of a vehicle with respect to the predetermined area are calculated more accurately, which allows improvement of accuracies of the detection pulse signal and the occupancy, for example.

(14) In the traffic index generation device according to the present embodiment, in the case where the control unit generates a plurality of kinds of the traffic indices, the control unit preferably determines, for each of the kinds of the traffic indices, whether or not to cause the communication unit to transmit the traffic index.

Thus, a communication line can be prevented from being tightened as compared to the case where all the kinds of traffic indices generated are uniformly transmitted as transmission objects.

(15) In the traffic index generation device according to the present embodiment, in the case where the control unit generates a plurality of kinds of the traffic indices, the control unit preferably determines, for each of kinds of external equipment as a transmission destination, the kind of the traffic index to be transmitted by the communication unit.

Thus, only the traffic index required for the traffic signal control that the external equipment (e.g., a central apparatus or a traffic signal controller) executes can be transmitted, the communication line is prevented from being tightened.

(16) A computer program according to the present embodiment is a computer program for causing a computer to function as the traffic index generation device according to the above (1) to (15). Therefore, the computer program according to the present embodiment provides the same operational effect as that achieved by the traffic index generation device according to the above (1) to (15).

(17) A traffic index generation method according to the present embodiment is a method to be executed by the traffic index generation device according to the above (1) to (15). Therefore, the traffic index generation method according to the present embodiment provides the same operational effect as that achieved by the traffic index generation device according to the above (1) to (15).

<Details of Embodiment of Present Invention>

Hereinafter, an embodiment of the present invention will be described in detail with reference to the drawings. At least some parts of the embodiment descried below can be combined together as desired.

[Definition of Terms]

In advance of describing the embodiment in detail, ten is used in this specification will be defined below.

A "vehicle" is a general vehicle that travels on a road, for example, a vehicle according to the Road Traffic Law. Vehicles according to the Road Traffic Law include automobiles, motorized bicycles, light vehicles, and trolley buses.

In the present embodiment, it is assumed that the mounting rate of on-vehicle communication apparatuses is relatively high, and most vehicles are probe vehicles equipped with on-vehicle communication apparatuses that transmit probe information to the outside.

A "roadside device" is a general term for devices installed at the road side (infrastructure side). Examples of the roadside device include a central apparatus, a traffic signal controller, and a roadside relay device which are described later.

A "traffic signal controller" is a controller that controls timings of turn-on and turn-off of a signal light unit at an intersection.

A "vehicle detector" is a roadside detector that detects, for example, passing of vehicles traveling on a road. Examples of the vehicle detector include a non-image-processing vehicle detector and an image-processing vehicle detector which are described later.

A "non-image-processing vehicle detector" is a non-image-processing roadside detector using no television camera. Specifically, it is a roadside detector that detects, one by one, vehicles passing through a predetermined detection area.

Examples of the non-image-processing vehicle detector include: an ultrasonic vehicle detector that detects a vehicle traveling directly below the detector by using an ultrasonic wave; a thermal vehicle detector that detects passing of a vehicle by a temperature change that occurs when the vehicle passes; and a loop coil that is embedded in a road and detects a vehicle by an inductance change.

An "image-processing vehicle detector" is an image-processing roadside detector using a television camera. Specifically, it is a roadside detector composed of a television camera that photographs an image of a vehicle traveling in a relatively wide measurement area set on one or a plurality of lanes.

The image-processing vehicle detector used in the traffic control system performs predetermined image processing on a digitized photographed image, whereby the vehicle detector can measure the traffic volume of vehicles traveling in the measurement area, the vehicle speeds, and the vehicle types, and moreover determine whether or not a vehicle is present in the measurement area.

A "detection area" is a predetermined area on a road, in which a vehicle detector (either an image-processing type or a non-image-processing type) detects vehicles. For example, in the case of the ultrasonic vehicle detector, an arrival range of an incident wave that extends almost circularly on the surface of a road is a detection area. In the case of the image-processing vehicle detector, a predetermined "measurement area" included in a photographing range of a television camera is a detection area.

A "detection pulse signal" is a pulse signal that is outputted from the non-image-processing vehicle detector installed on a road when the vehicle detector detects one vehicle in a predetermined detection area. Accordingly, when a plurality of vehicles pass through the detection area, pulse signals corresponding to the respective vehicles are time-sequentially outputted.

An "imaginary area" is a predetermined area on a coordinate system, corresponding to a predetermined area (detection area) on a road. In the present embodiment, assuming that a vehicle detector (either an image-processing type or a non-image-processing type) is installed on a road, an imaginary area is an area on a coordinate system, corresponding to a detection area of the vehicle detector. In addition, information of coordinate values or the like for defining an imaginary area is referred to as "area information".

The imaginary area may be defined as a two-dimensionally extending imaginary area or a three-dimensionally extending imaginary space, or may be defined as a line segment (one dimensional) that crosses a road. In the present embodiment, it is assumed that a two-dimensionally extending imaginary area is set in a traffic index generation device (e.g., a roadside relay device).

An "imaginary pulse signal" is a detection pulse signal with respect to a probe vehicle that has passed through an imaginary area. Specifically, it is a pulse signal outputted from a traffic index generation device (e.g., a roadside relay device) when the traffic index generation device detects one probe vehicle in a predetermined imaginary area.

Accordingly, when a plurality of probe vehicles pass through the imaginary area, imaginary pulse signals corresponding to the respective probe vehicles are time-sequentially outputted.

"Probe information" is information that is wirelessly transmitted from an on-vehicle communication apparatus of a probe vehicle actually traveling on a road, to the outside. The probe information relates to the state of the probe vehicle at the present time. The probe information is sometimes referred to as probe data or floating car data.

The probe information includes, for example, vehicle ID, temporal information, vehicle position (e.g., latitude, longitude, and altitude), vehicle speed, vehicle heading, acceleration, and the like of a vehicle that has transmitted the probe information. The probe information may include data such as vehicle type, vehicle length, and the like.

A "traffic index" is an index relating to passing of vehicles on a road, and is used as input data for traffic signal control that is performed by a roadside device such as a central apparatus.

In a traffic control system including a vehicle detector, a traffic volume (number of vehicles), an occupancy, a speed, a travel time, or the like, which are calculated from a detection pulse signal or a photographed image, corresponds to a traffic index. In the present embodiment, these parameters calculated from an imaginary area (e.g., an imaginary area A shown in FIG. 5) obtained by emulating a detection area and the vehicle position of a probe vehicle correspond to traffic indices.

A "wireless communication apparatus" is an apparatus that has a communication function of wirelessly transmitting and receiving a communication frame according to a predetermined protocol, and serves as a transmission/reception main body of wireless communication. Examples of the wireless communication apparatus of the present embodiment include a roadside relay device and an on-vehicle communication apparatus which are described later.

A "communication frame" is a general term for a PDU (Protocol Data Unit) used for wireless communication, and a PDU used for wired communication between roadside devices.

A "roadside relay device" is a device that is installed at the road side (infrastructure side), and relays communication between the central apparatus and the traffic signal controller. The roadside relay device of the present embodiment is also capable of wireless roadside-to-vehicle communication with an on-vehicle communication apparatus, wireless communication with a terminal device possessed by a traffic administrator, and the like.

An "on-vehicle communication apparatus" is a wireless communication apparatus that is permanently or temporarily mounted on a vehicle. A portable terminal such as a cellular phone or a smartphone, which is brought into a vehicle by an occupant, also corresponds to an on-vehicle communication apparatus if the portable terminal is capable of wireless communication with a roadside device.

[Overall Configuration of Traffic Control System]

FIG. 1 is a perspective view showing an example of a configuration of a traffic control system according to the embodiment of the present invention.

In FIG. 1, as an example of a road structure, a grid-pattern structure is assumed in which a plurality of roads in a north-to-south direction and a plurality of roads in an east-to-west direction intersect with each other, but the road structure is not limited thereto. In addition, the traffic control system may be located outside Japan, and may be applied to a road structure on which vehicles 5 travel on the right side.

As shown in FIG. 1, the traffic control system of the present embodiment includes: traffic signal units 1; roadside relay devices 2; on-vehicle communication apparatuses 3 (refer to FIGS. 2 and 3); a central apparatus 4; vehicles 5 equipped with the on-vehicle communication apparatuses 3; a terminal device 6 (refer to FIGS. 3 and 4) of a traffic administrator; and the like.

A traffic signal unit 1 and a roadside relay device 2 are installed at each of intersections Ji (i=1 to 12 in FIG. 1) included in an area that the central apparatus 4 covers, and are connected to a router 9 via a communication line 7.

The router 9 is also connected to the central apparatus 4 by the communication line 7. The communication line 7 is a metallic line, for example. As a communication method for communication apparatuses using the communication line 7, ISDN (Integrated Services Digital Network) is adopted in Japan.

The central apparatus 4 is provided inside a traffic control center. The central apparatus 4 forms a LAN (Local Area Network) with the traffic signal units 1 and the roadside relay devices 2 installed at the intersections Ji included in the area that the central apparatus 4 covers.

Therefore, the central apparatus 4 is able to perform wired communication with each traffic signal unit 1 and each roadside relay device 2 via the communication line 7 as a communication medium. The central apparatus 4 may be installed not inside the traffic control center but on a road.

As shown in FIG. 1, information (hereinafter referred to as "downlink information") that the central apparatus 4 transmits to the communication line 7 includes a signal control instruction S1, traffic control information S2, and the like.

Figure 2:
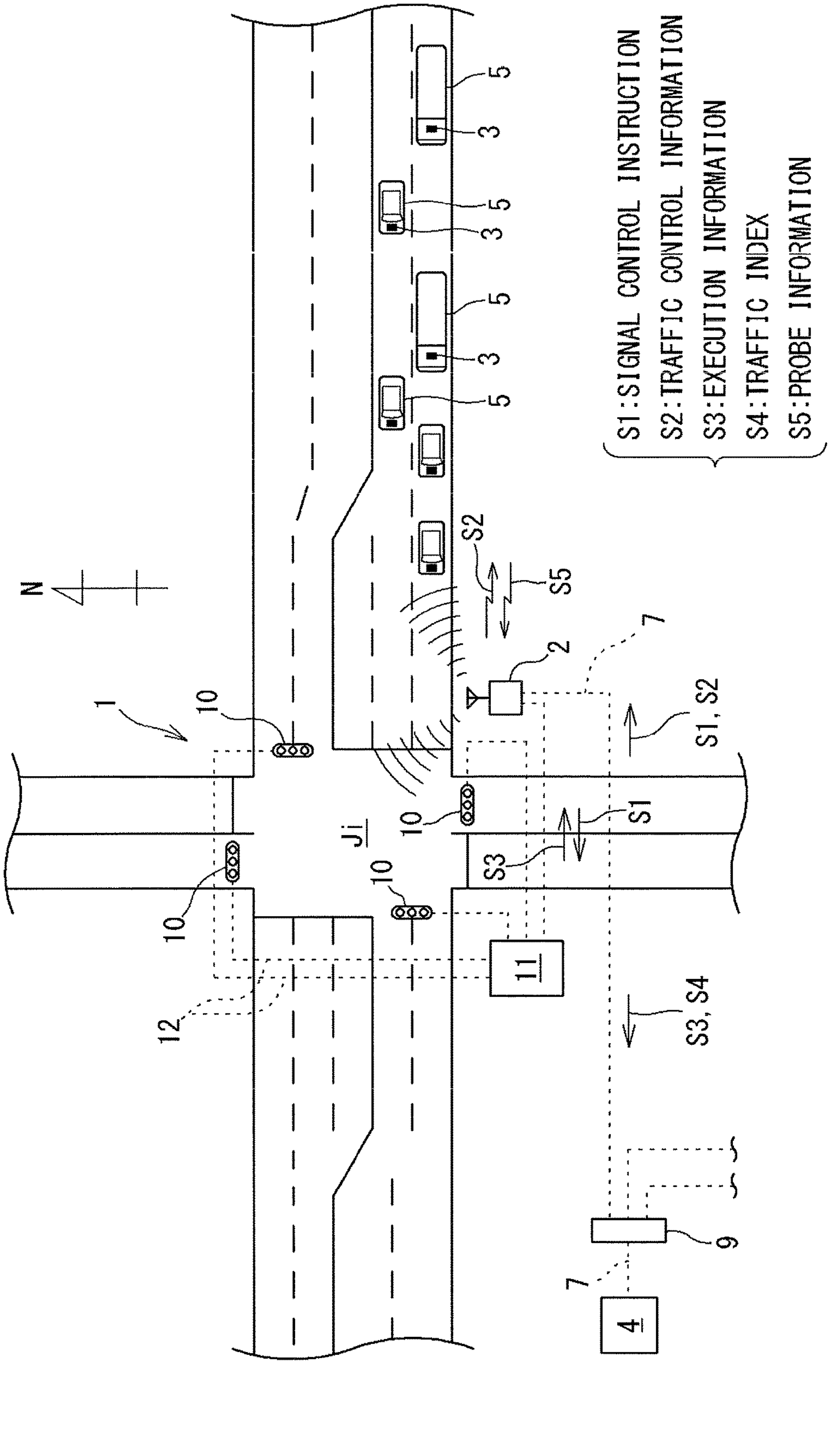
FIG. 2 is a plan view showing an example of a configuration of a roadside device around an intersection.

The signal control instruction S1 is information (e.g., cycle start time, number of seconds for step execution, or the like) indicating traffic light switching timing in each traffic signal unit 1, and is transmitted to the traffic signal controller 11 (refer to FIG. 2). The traffic control information S2 is, for example, traffic jam information, traffic regulation information, and the like, and is transmitted to each roadside relay device 2.

Information (hereinafter referred to as "uplink information") that the central apparatus 4 receives from the communication line 7 includes signal control execution information S3, a traffic index S4, and the like.

The signal control execution information (hereinafter referred to as "execution information") S3 is information indicating the record of signal control that the traffic signal controller 11 has actually performed in a previous cycle. Therefore, the execution information S3 is generated by the traffic signal controller 11.

The traffic index S4 is generated by the roadside relay device 2. Upon receiving probe information S5 from a vehicle 5, the roadside relay device 2 generates a traffic index S4 by using the received probe information S5, and transmits the generated traffic index S4 to the central apparatus 4 and the like.

Since the roadside relay device 2 of the present embodiment generates the traffic index S4 by using an imaginary area (e.g., an imaginary area A shown in FIG. 5) obtained by emulating a detection area of a vehicle detector, the traffic control system shown in FIG. 1 includes no vehicle detector. However, vehicle detectors may be installed on some of roads included in the area that the central apparatus 4 covers.

[Roadside Device Around Intersection]

FIG. 2 is a plan view showing an example of a configuration of a roadside device around an intersection Ji.

As shown in FIG. 2, the traffic signal unit 1 includes: a plurality of signal light units 10 that display presence/absence of right of way at approach paths of the intersection Ji; and a traffic signal controller 11 that controls timings of turn-on and turn-off of each signal light unit 10. The signal light units 10 are connected to the traffic signal controller 11 via a predetermined signal control line 12.

The roadside relay device 2 is installed near the intersection Ji so as to be wirelessly communicable with a vehicle 5 traveling on a road branching from the intersection Ji. Therefore, the roadside relay device 2 is able to receive radio waves transmitted from vehicles 5 performing vehicle-to-vehicle communication through the on-vehicle communication apparatuses 3 on a road.

The traffic signal controller 11 is communicably connected to the roadside relay device 2 via the communication line 7. The traffic signal controller 11 may be connected to the router 9 without the intervention of the roadside relay device 2.

The traffic signal controller 11 transmits generated execution information S3 to the roadside relay device 2. Upon receiving the execution information S3, the roadside relay device 2 uplink-transmits the execution information S3 to the central apparatus 4.

The roadside relay device 2 generates a traffic index S4 from probe information S5 received from an on-vehicle communication apparatus 3, and uplink-transmits the traffic index S4 to the central apparatus 4. In addition, the roadside relay device 2 can also wirelessly transmit the generated traffic index S4 to the terminal device 6 or the like.

In the case where a signal control instruction S1 is included in downlink information from the central apparatus 4, the roadside relay device 2 transfers the received signal control instruction S1 to the traffic signal controller 11.

In the case where traffic control information S2 is included in the downlink information from the central apparatus 4, the roadside relay device 2 wirelessly broadcasts the traffic control information S2 to provide the traffic control information S2 to the vehicles 5.

The execution information S3 and the traffic index S4 uplink-transmitted from the roadside relay device 2 are transmitted to the central apparatus 4 via the router 9 by wired communication using the communication line 7.

The traffic signal controller 11 and the router 9 may be connected to each other by the communication line 7, so that the traffic signal controller 11 can perform downlink reception of the signal control instruction S1 and uplink transmission of the execution information S3 with the central apparatus 4 without the intervention of the roadside relay device 2.

[Central Apparatus]

The central apparatus 4 includes a control device composed of a work station (WS), a personal computer (PC), or the like. This control device comprehensively performs: collection, processing, and recording of the various kinds of information S3 and S4 uplink-transmitted from the roadside devices installed in the area that the control apparatus covers; and signal control and information provision based on the information S3 and S4.

Specifically, the central apparatus 4 is able to perform, for the traffic signal units 1 at the intersections Ji included in the area that the central apparatus 4 covers, "coordinated control" for controlling a group of traffic signal units 1 on the same road, "wide-area traffic control (area traffic control)" corresponding to the coordinated control expanded onto a road network, and the like.

The central apparatus 4 includes a communication device that performs communication by using the communication line 7. The communication device of the central apparatus 4 executes downlink transmission of the signal control instruction S1 and the traffic control information S2, and uplink reception of the execution information S3 and the traffic data S4.

The control device of the central apparatus 4 is able to execute the above-mentioned coordinated control and wide-area traffic control by using the uplink information transmitted from the roadside devices at the respective intersections Ji.

Further, the control device of the central apparatus 4 downlink-transmits the signal control instruction S1 for each calculation period (e.g., 2.5 min) of the coordinated control or the like, and downlink-transmits the traffic control information S2 for each predetermined period (e.g., 5 min).

[Combination of Communication Major Units of Wireless Communication System]

Figure 3:
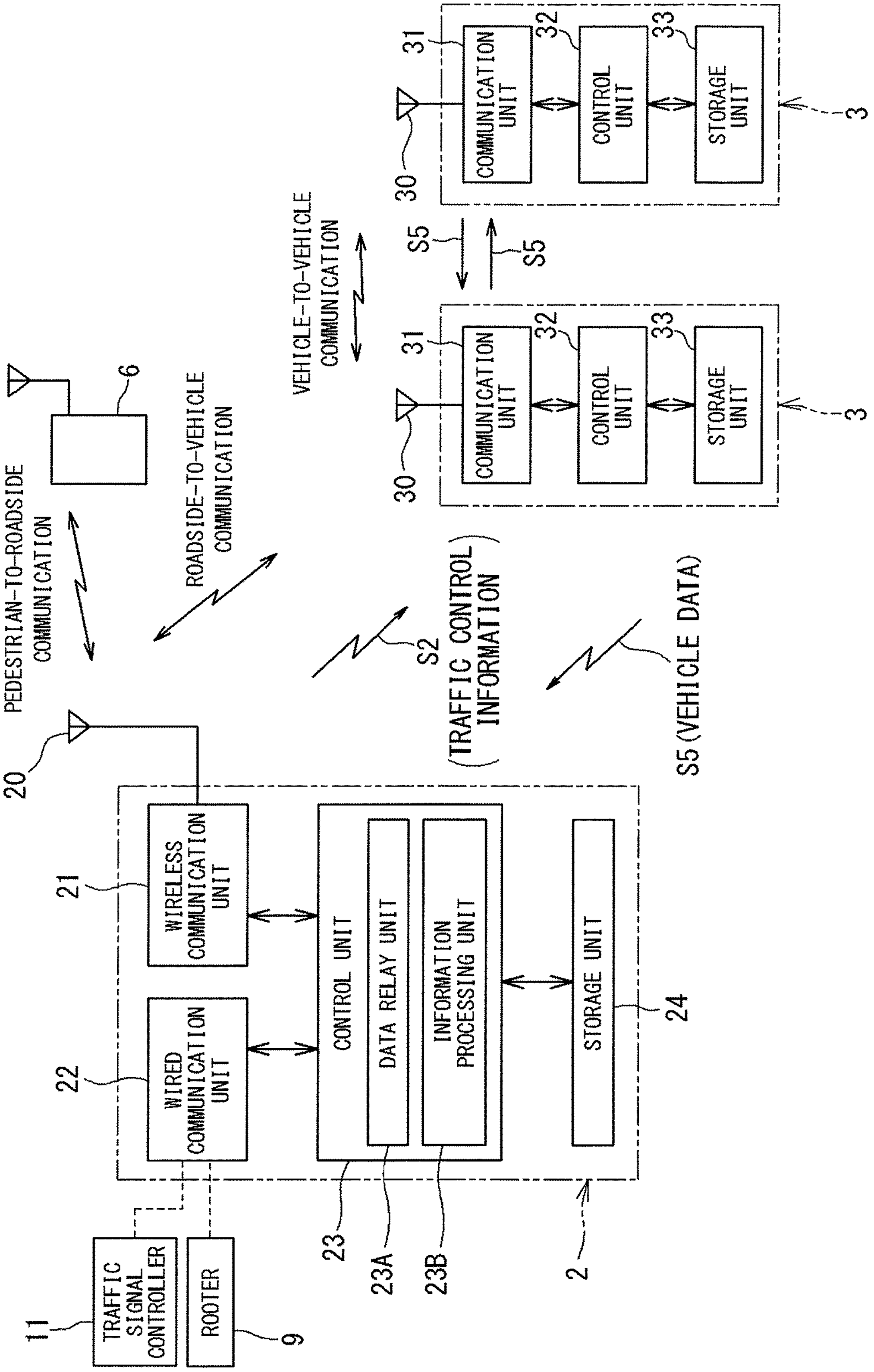
FIG. 3 is a block diagram showing combination of communication major units of the wireless communication system, and the internal configuration of the wireless communication apparatus.

FIG. 3 is a block diagram showing combination of communication major units of the wireless communication system, and the internal configuration of the wireless communication apparatus.

As shown in FIG. 3, the traffic control system of the present embodiment includes a wireless communication system including; a roadside relay device 2 installed near each intersection Ji; and on-vehicle communication apparatuses 3 mounted to vehicles 5 traveling on a road.

Examples of combinations of the communication main units in the wireless communication system including the roadside relay device 2 and the on-vehicle communication apparatuses 3 include: "vehicle-to-vehicle communication" in which the on-vehicle communication apparatuses 3 communicate with each other; and "roadside-to-vehicle communication" in which the roadside relay device 2 communicates with the on-vehicle communication apparatus 3.

Although not shown in FIG. 3, in the case where the distance between adjacent two intersections Ji is within the radio wave arrival distance of the roadside relay device 2, "roadside-to-roadside communication (not shown)" may be included, in which two roadside relay devices 2 communicate with each other.

It is assumed that, in the wireless communication system of the present embodiment, as a multiple access method suitable for coexistence of the vehicle-to-vehicle communication and the roadside-to-vehicle communication, for example, a multiple access method that follows "standards of 700 MHz band intelligent transport system (ARIB STD-T109)" is adopted.

However, the communication method for the wireless communication between the roadside relay device 2 and the on-vehicle communication apparatus 3 is not limited to the multiple access method based on the above standards.

In the multiple access method based on the above standards, time slots dedicated to the road side, in which the roadside relay device 2 performs wireless communication, are assigned by TDMA (Time Division Multiple Access), while time slots other than the time slots dedicated to the road side are assigned to vehicle-to-vehicle communication between the on-vehicle communication apparatuses 3 that adopts CSMA/CA (Carrier Sense Multiple Access/Collision Avoidance).

According to this multiple access method, the roadside relay device 2 performs wireless communication only in the time slots assigned thereto. That is, time zones other than the time slots for the roadside relay device 2 are opened as transmission time zones for the on-vehicle communication apparatuses 3 by the CSMA.

In addition, when the roadside relay device 2 receives a radio wave transmitted in the vehicle-to-vehicle communication without negotiation with the on-vehicle communication apparatuses 3, the roadside relay device 2 can obtain the probe information S5 transmitted/received between the vehicles 5 by the vehicle-to-vehicle communication.

A communication frame, which is transmitted/received between the on-vehicle communication apparatuses 3 by the vehicle-to-vehicle communication, includes storage regions corresponding to: vehicle ID, temporal information, vehicle position, vehicle state information, vehicle attribute information, and the like of the vehicle 5 that has generated the probe information S5. In these storage regions, the following values are stored, respectively.

In the "temporal information", a time value of a time point, at which the vehicle 5 has determined the contents of data to be stored in the communication frame, is stored. In the "vehicle position", values of latitude, longitude, altitude, and the like corresponding to the above time value of the time point are stored.

In the "vehicle state information", values of the vehicle speed, vehicle heading, acceleration, and the like corresponding to the time value are stored. In the "vehicle attribute information", identification values of the vehicle size (standard-size vehicle, large-size vehicle, or the like), the purpose of the vehicle (private vehicle, emergency vehicle, or the like), the vehicle width, the vehicle length, and the like are stored.

Each on-vehicle communication apparatus 3 broadcasts the communication frame of the vehicle-to-vehicle communication at predetermined intervals (e.g., 0.1 sec). Therefore, the vehicles 5 that perform the vehicle-to-vehicle communication can perceive, substantially in real time, the probe information S5, of the communication partner, including the above information.

[Configuration of Roadside Relay Device]

As shown in FIG. 3, the roadside relay device 2 includes: a wireless communication unit 21 to which an antenna 20 for wireless communication is connected; a wired communication unit 22 that communicates with the central apparatus 4, the traffic signal controller 11, and the like; a control unit 23 that is composed of a processor such as a CPU (Central Processing Unit) and controls the above communications; and a storage unit 24 that is composed of storage devices such as a ROM, a RAM, and the like and is connected to the control unit 23.

The storage unit 24 of the roadside relay device 2 stores therein a computer program for communication control that the control unit 23 executes, various kinds of data received from other wireless communication apparatuses, and the like.

The control unit 23 of the roadside relay device 2 includes, as functional units achieved by execution of the above-mentioned computer program: a data relay unit 23A that performs a relay process to each of the communication units 21, 22; and an information processing unit 23B that performs a calculation process of calculating a traffic index S4 by using the probe information S5, a setting process of setting an imaginary area (e.g., an imaginary area A shown in FIG. 5) required for the calculation process, and the like.

That is, the computer program stored in the storage unit 24 is a computer program that causes the control unit 23 of the roadside relay device 2 to function as a processor for executing the above-mentioned data relay process, calculation process, and the like.

This computer program may be delivered in the state of being recorded in a known recording medium such as a CD-ROM or a DVD-ROM, or may be delivered by information transmission (download) from a computer device such as a server computer.

When the wired communication unit 22 receives the signal control instruction S1 from the central apparatus 4, the data relay unit 23A of the roadside relay device 2 causes the wired communication unit 22 to transfer the received signal control instruction S1 to the traffic signal controller 11.

When the wired communication unit 22 receives the traffic control information S2 from the central apparatus 4, the data relay unit 23A causes the wireless communication unit 21 to broadcast the received traffic control information S2 so as to provide the traffic control information S2 to the probe vehicles 5.

When the wired communication unit 22 receives the execution information S3 from the traffic signal controller 11, the data relay unit 23A causes the wired communication unit 22 to transfer the received execution information S3 to the central apparatus 4.

When the wireless communication unit 21 receives the probe information S5 from the on-vehicle communication apparatus 3, the data relay unit 23A causes the storage unit 24 to store the received probe information S5. The information processing unit 23B generates a traffic index S4 from the probe information S5, and causes the storage unit 24 to store the traffic index S4. The data relay unit 23A causes the wired communication unit 22 to transmit the stored traffic index S4 to the central apparatus 4.

The wireless communication unit 21 includes a communication interface such as a wireless LAN or a Bluetooth (registered trademark) for performing wireless communication (pedestrian-to-roadside communication) with a terminal device 6, in addition to the wireless communication with the on-vehicle communication apparatus 3. That is, the wireless communication unit 21 of the roadside relay device 2 can also wirelessly communicate with a terminal device 6 that has been carried near the intersection Ji by a traffic engineer of the traffic control center.

Therefore, the data relay unit 23A of the roadside relay device 2 can also transmit the traffic index S4 generated by the information processing unit 23B to the terminal device 6.

[Configuration of On-Vehicle Communication Apparatus]

As shown in FIG. 3, each on-vehicle communication apparatus 3 includes: a communication unit 31 to which an antenna 30 for wireless communication is connected; a control unit 32 that is composed of a processor or the like and performs communication control for the communication unit 31; and a storage unit 33 that is connected to the control unit 32 and composed of storage devices such as a ROM, a RAM, and the like.

The storage unit 33 of the on-vehicle communication apparatus 3 stores therein a computer program for the communication control that the control unit 32 executes, various data received from other wireless communication apparatuses, and the like.

The control unit 32 of the on-vehicle communication apparatus 3 is a control unit that causes the communication unit 31 to perform wireless communication by a carrier sensing method for vehicle-to-vehicle communication.

Therefore, the communication unit 31 of the on-vehicle communication apparatus 3 detects a reception level of a predetermined carrier frequency all the time. The communication unit 31 does not perform wireless transmission when the value of the reception level is higher than or equal to a certain threshold, and performs wireless transmission only when the value is less than the threshold.

The control unit 32 of the on-vehicle communication apparatus 3 generates, at predetermined intervals, probe information S5 of the corresponding vehicle 5, which includes information such as vehicle ID, temporal information, vehicle position (latitude, longitude, etc.), vehicle speed, vehicle heading, vehicle attribute, and the like, and causes the communication unit 31 to broadcast the generated probe information S5.

The communication unit 31 of the on-vehicle communication apparatus 3 also has a GPS function for receiving the vehicle position, absolute time, and the like of the corresponding vehicle 5, from the GPS (Global Positioning System) satellite.

[Configuration of Terminal Device]

Figure 4:
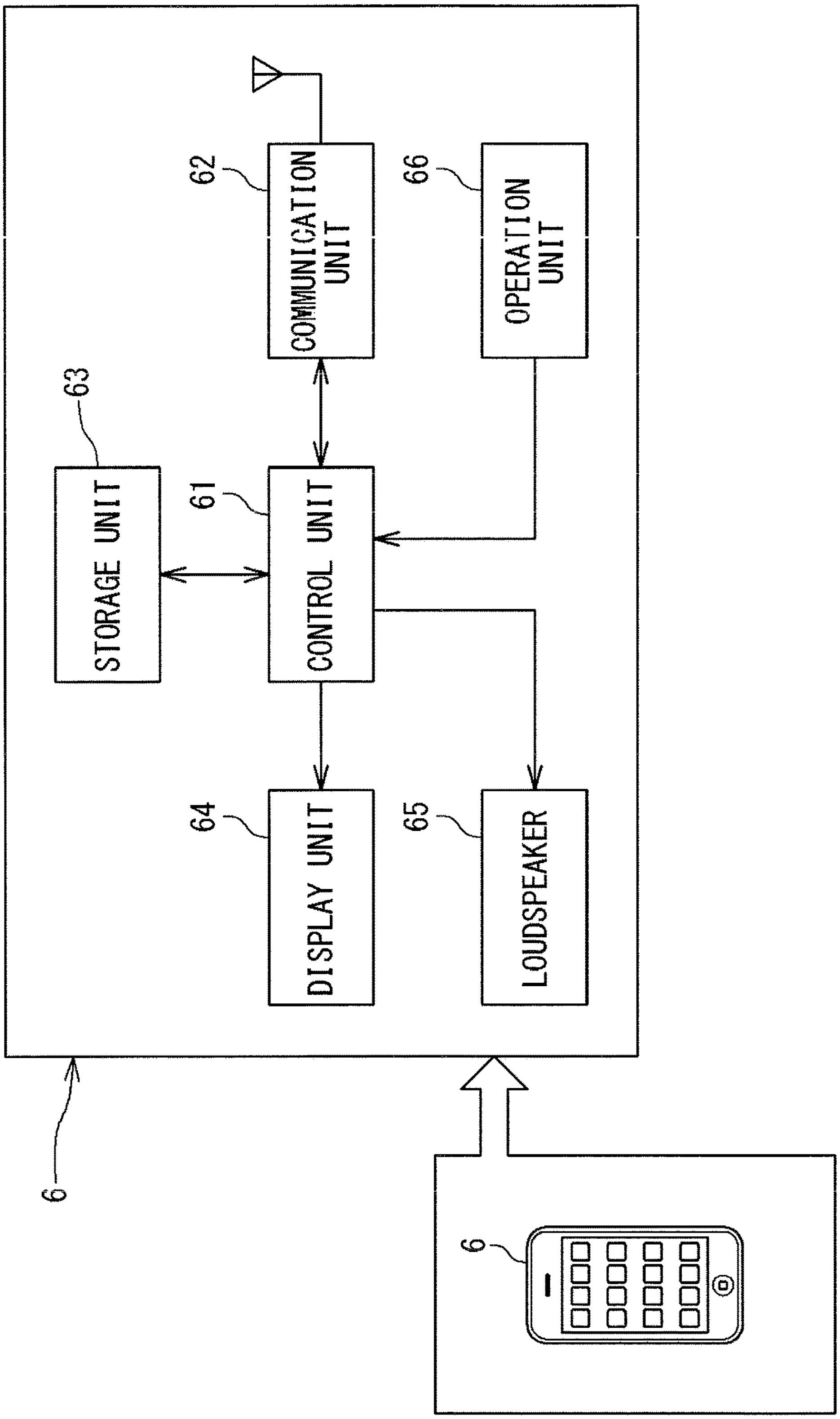
FIG. 4 is a block diagram showing an example of a configuration of a terminal device.

FIG. 4 is a block diagram showing an example of the configuration of the terminal device 6.

FIG. 4 shows a tablet computer as an example of the terminal device 6 that is carried into the site by a traffic engineer. However, the terminal device 6 may be any information processing device as long as it can be carried by the traffic engineer and can communicate with the roadside relay device 2. For example, the terminal device 6 may be a smartphone, a notebook PC, a foldable mobile phone, or the like.

As shown in FIG. 4, the terminal device 6 includes a control unit 61, a communication unit 62, a storage unit 63, a display unit 64, a loudspeaker 65, and an operation unit 66.

The communication unit 62 includes: a communication interface capable of telephone and data communications via a base station of a communication carrier; and a communication interface that wirelessly communicates with the roadside relay device 2 by using a predetermined communication protocol of a wireless LAN, Bluetooth, or the like.

The control unit 61 includes a CPU, a ROM, a RAM, and the like. The control unit 61 reads and executes a computer program such as an OS (Operating System) stored in the storage unit 63, thereby controlling the operation of the whole terminal device 6.

The storage unit 63 is composed of a hard disk, a non-volatile memory, and the like, and stores therein various kinds of computer programs and data.

The storage unit 63 stores therein various kinds of application software (hereinafter simply referred to as "applications") installed from a predetermined server or the like by a traffic engineer (hereinafter also referred to as "user").

The applications include applications for performing: control of communication with the roadside relay device 2; display of the traffic index S4 generated by the roadside relay device 2; reception of input of an imaginary area to be transmitted to the roadside relay device 2; transmission of positional information of the imaginary area; and the like.

The display unit 64 is composed of a liquid crystal display, for example. The display unit 64 displays, for the user, information (traffic index S4 or the like) provided for the traffic administrator, which is included in a communication frame received from the roadside relay device 2.

For example, the display unit 64 displays, on a predetermined display window, the traffic index S4, the present position of the imaginary area, and the like which are included in the provided information. On the display unit 64, image data composed of a plan view or bird's-eye view of an intersection Ji may also be displayed.

The loudspeaker 65 audio-outputs, for the user, an audio input by the user and/or predetermined audio information. The loudspeaker 65 may be a built-in loudspeaker of the terminal device 6, or may be an earphone loudspeaker when the user wears an earphone.

The operation unit 66 is composed of: a touch interface that generates an operation signal in response to a touch on a screen of the display unit 64; an operation interface that generates an operation signal in response to a push button operation; an audio interface that generates an operation signal in response to an audio input to a microphone; and the like.

The operation unit 66 outputs, to the control unit 61, an operation signal according to an operation input performed by the user to at least one of the above interfaces, and the control unit 61 performs information processing according to the operation signal received from the operation unit 66.

[Traffic Volume Calculation Process]

Figure 5:
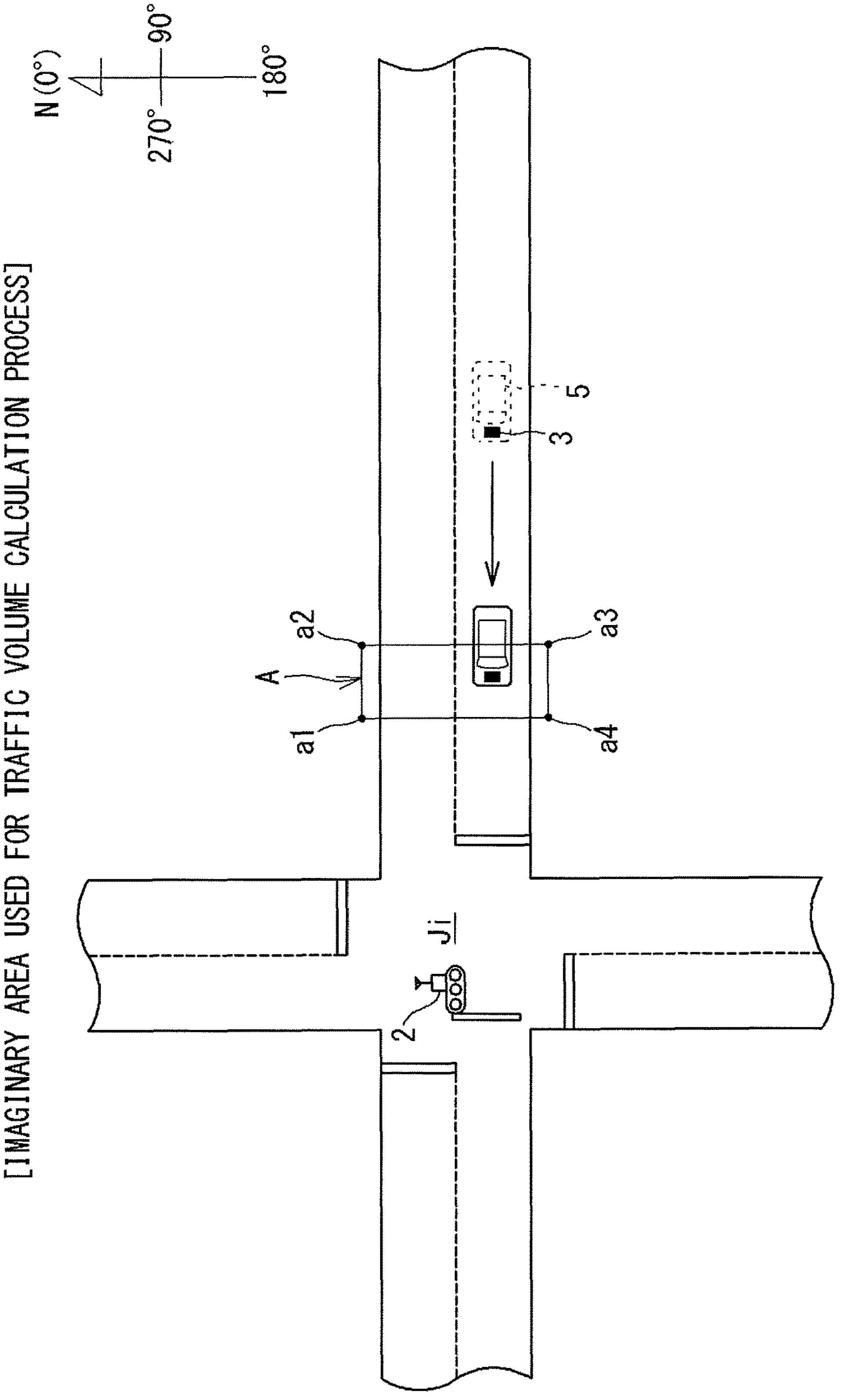
FIG. 5 is an explanatory diagram showing an example of an imaginary area used for a traffic volume calculation process.
Figure 6:
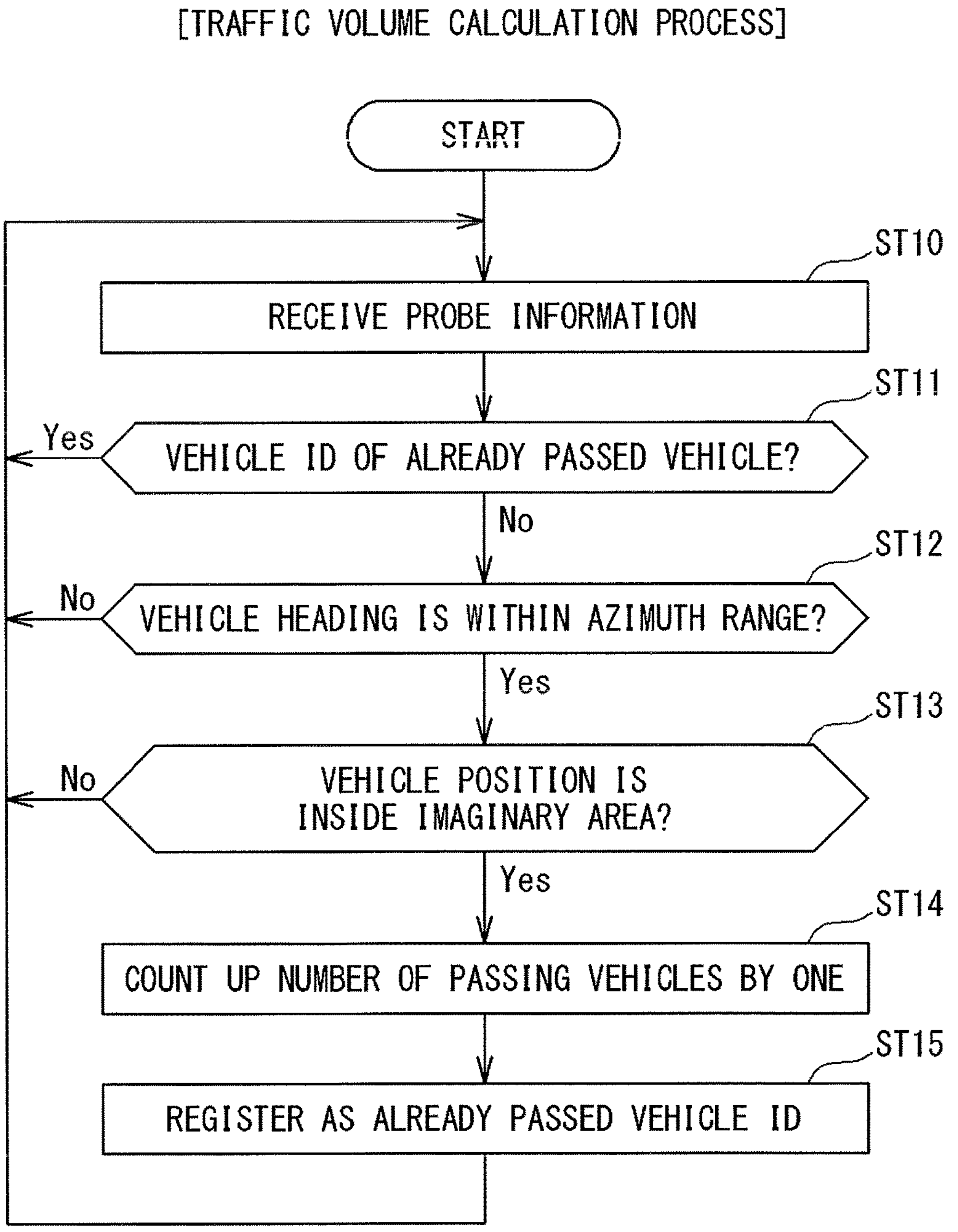
FIG. 6 is a flowchart showing an example of the traffic volume calculation process.

FIG. 5 is an explanatory diagram showing an example of an imaginary area A that the information processing unit 23B uses for a traffic volume calculation process. FIG. 6 is a flowchart showing an example of the traffic volume calculation process that the information processing unit 23B executes. As shown in FIG. 5, a coordinate system expressing a vehicle heading of a probe vehicle 5 is defined with the north being an origin point (0°), and the clockwise direction from the origin point being the positive direction.

Assuming that one non-image-processing vehicle detector is installed on a road, the imaginary area A is an imaginary area corresponding to a detection area of this vehicle detector.

This imaginary area A is an imaginary area for calculating the traffic volume of probe vehicles 5 traveling on a westward approach path among four approach paths to an intersection Ji. Therefore, the imaginary area A is an area enclosed by a rectangle having four vertexes a1 to a4 and positioned to the east side of the intersection Ji.

The imaginary area A has been set in the roadside relay device 2 in advance by causing the storage unit 24 of the roadside relay device 2 to store the coordinate values (latitudes and longitudes) of the vertexes a1 to a4.

The coordinate values of the four vertexes a1 to a4 (area information) of the imaginary area A are selected so as to satisfy the following conditions X1 to X3, for example.

Condition X1: the latitudes of the vertex a1 and the vertex a2 are on the north side relative to an eastward exit path.

Condition X2: the latitudes of the vertex a3 and the vertex a4 are on the south side relative to a westward approach path.

Condition X3: the length of the imaginary area A in the vehicle advancing direction (the difference in longitude between the vertex a1 and the vertex a2 and the difference in longitude between the vertex a3 and the vertex a4) is less than or equal to an average length (e.g., 4.5 m) of standard-size vehicles. In addition, the length of the imaginary area A is larger than or equal to a travel distance (2.0 m if the estimated speed is 20 msec) of a probe vehicle 5 corresponding to a transmission cycle (e.g., 0.1 sec) of the probe information S5.

According to the above conditions X1 and X2, the width dimension (length in the south-to-north direction) of the imaginary area A is larger than the width of the road extending in the east-to-west direction and connecting to the intersection Ji.

As shown in FIG. 6, upon newly receiving probe information S5 (step ST10), the information processing unit 23B of the roadside relay device 2 determines whether or not the vehicle ID included in the probe information S5 is a vehicle ID that has already passed through the imaginary area A (step ST11).

The above determination process can be performed by, for example, providing the storage unit 24 with a memory region in which a vehicle ID is registered for only a predetermined time period (e.g., 10 sec), and determining whether or not the vehicle ID included in the newly received probe information S5 corresponds to the already registered vehicle ID.

When the result of the determination in step ST11 is positive, the information processing unit 23B returns the processing to the step prior to step ST10.

When the result of the determination in step ST11 is negative, the information processing unit 23B further determines whether or not the vehicle heading of the probe vehicle 5, which is included in the probe information S5, is within a predetermined heading range (step ST12).

In the example of calculating the traffic volume on the westward approach path shown in FIGS. 5 and 6, the above-mentioned determination process can be performed by determining, for example, whether or not the vehicle heading of the probe vehicle 5 is within a predetermined heading range (e.g., ±35°) with the westward heading (=270°) being a center value.

When the result of the determination in step ST12 is negative, the information processing unit 23B returns the processing to the step prior to step ST10.

When the result of the determination in step ST12 is positive, the information processing unit 23B further determines whether or not the vehicle position of the probe vehicle 5, which is included in the probe information S5, is inside the imaginary area A (step ST13).

The above-mentioned determination process can be performed by determining whether or not the coordinate values (e.g., latitude value=x, longitude value=y) of the vehicle position of the probe vehicle 5 satisfy the following inequalities:

latitude values of vertex al and vertex a2≤latitude value x≤latitude values of vertex a3 and vertex a4;

longitude values of vertex al and vertex a4≤longitude value y≤longitude values of vertex a2 and vertex a3.

When the result of the determination in step ST13 is negative, the information processing unit 23B returns the processing to the step prior to step ST10.

When the result of the determination in step ST13 is positive, the information processing unit 23B counts up the number of passing vehicles (traffic volume) by one (step ST14), and registers the vehicle ID included in the received probe information S5 into the memory region for the already passed vehicle (step ST15), and then returns the processing to the step prior to step ST10.

As described above, when the information processing unit 23B executes the calculation process shown in FIG. 6, the number of passing vehicles (traffic volume) is counted up every time a different probe vehicle 5 passes through the imaginary area A.

Therefore, it is possible to calculate the traffic volume of probe vehicles 5 that has passed through the imaginary area A westward to enter the intersection Ji.

In the case where the traffic volume on the eastward approach path, the southward approach path, or the northward approach path is calculated with respect to the intersection Ji, the storage unit 24 may be caused to store an imaginary area having coordinate values positioned on the west side, the north side, or the south side of the intersection Ji, in a similar manner to that for the imaginary area A.

Then, a calculation process similar to that shown in FIG. 6 may be executed by using the stored imaginary area for each approach direction.

In the above-mentioned traffic volume calculation process, the traffic volume may be corrected by using the mounting rate of the on-vehicle communication apparatus 3. For example, assuming that the mounting rate of the on-vehicle communication apparatus 3 is α, the traffic volume after corrected can be calculated by dividing the traffic volume that has been generated by the information processing unit 23B and is not corrected, by the mounting rate α.

The mounting rate used for the correction may be a constant that has been inputted by a traffic control officer in advance, or may be a ratio between a traffic volume calculated from detection signals of a vehicle detector actually installed on a road and a traffic volume calculated by the roadside relay device 2.

[Travel time Calculation Process]

Figure 7:
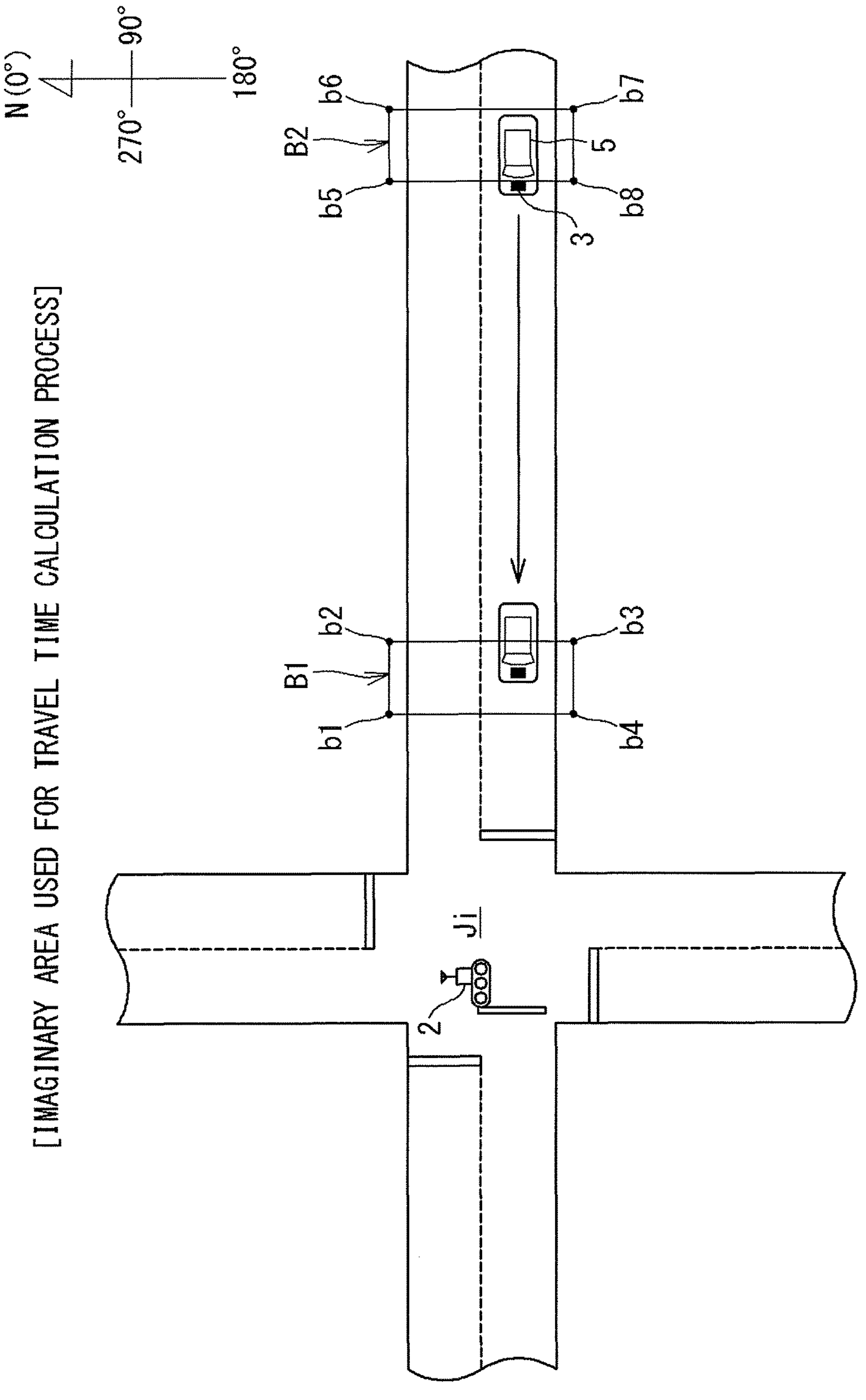
FIG. 7 is an explanatory diagram showing examples of imaginary areas uses for a travel time calculation process.

FIG. 7 is an explanatory diagram showing examples of imaginary areas B1 and B2 that the information processing unit 23B uses for a travel time calculation process.

Assuming that two non-image-processing vehicle detectors are installed on a road, the imaginary areas B1 and B2 are imaginary areas corresponding to detection areas of the vehicle detectors.

The imaginary areas B1 and B2 are imaginary areas for measuring the travel time of a probe vehicle 5 traveling on a westward approach path among four approach paths to an intersection Ji.

Therefore, the imaginary area B1 is an area enclosed by a rectangle having four vertexes b1 to b4 and positioned to the east side of the intersection Ji, and the imaginary area B2 is an area enclosed by a rectangle having four vertexes b5 to b8 and positioned further to the east of the imaginary area B1.

The imaginary areas B1 and B2 have been set in the roadside relay device 2 in advance by causing the storage unit 24 of the roadside relay device 2 to store the coordinate values (latitudes and longitudes) of the vertexes b1 to b4 and the coordinate values (latitudes and longitudes) of the vertexes b5 to b8.

The conditions for selecting the coordinate values of the four vertexes b1 to b4, b5 to b8 (area information) of the imaginary area B1, B2 are identical to the conditions X1 to X3 for the imaginary area A shown in FIG. 6.

In the case where the travel time of the probe vehicle 5 is calculated by using the two imaginary areas B1 and B2, the information processing unit 23B executes the calculation process shown in FIG. 6 for each of the downstream side imaginary area B1 and the upstream side imaginary area B2.

When the result of the calculation process is that a probe vehicle 5 having a specific vehicle ID has passed through the upstream side imaginary area B2, the information processing unit 23B causes the storage unit 24 to store the time at which the probe vehicle 5 has passed through the imaginary area B2 (the time at which the vehicle position has existed in the imaginary area B2).

Thereafter, when determining that the probe vehicle 5 of the same vehicle ID has passed through the downstream side imaginary area B1, the information processing unit 23B causes the storage unit 24 to store the time at which the probe vehicle has passed through the imaginary area B1 (the time at which the vehicle position has existed in the imaginary area B1).

Then, the information processing unit 23B subtracts the time of passage through the imaginary area B2 from the time of passage through the imaginary area B1 to calculate the travel time of the probe vehicle 5.

The two imaginary areas B1 and B2 used for the travel time calculation process may be two imaginary areas having coordinate values positioned on the west side, the north side, or the south side of the intersection Ji. In this case, the travel time of a probe vehicle 5 can be obtained for each approach direction to the intersection Ji.

In addition, the coordinate values may be selected such that the intersection Ji is positioned between the two imaginary areas B1 and B2. In this case, it is possible to calculate the travel time of a probe vehicle 5, including the traffic-light waiting time at the intersection Ji.

[Speed Calculation Process]

Figure 8:
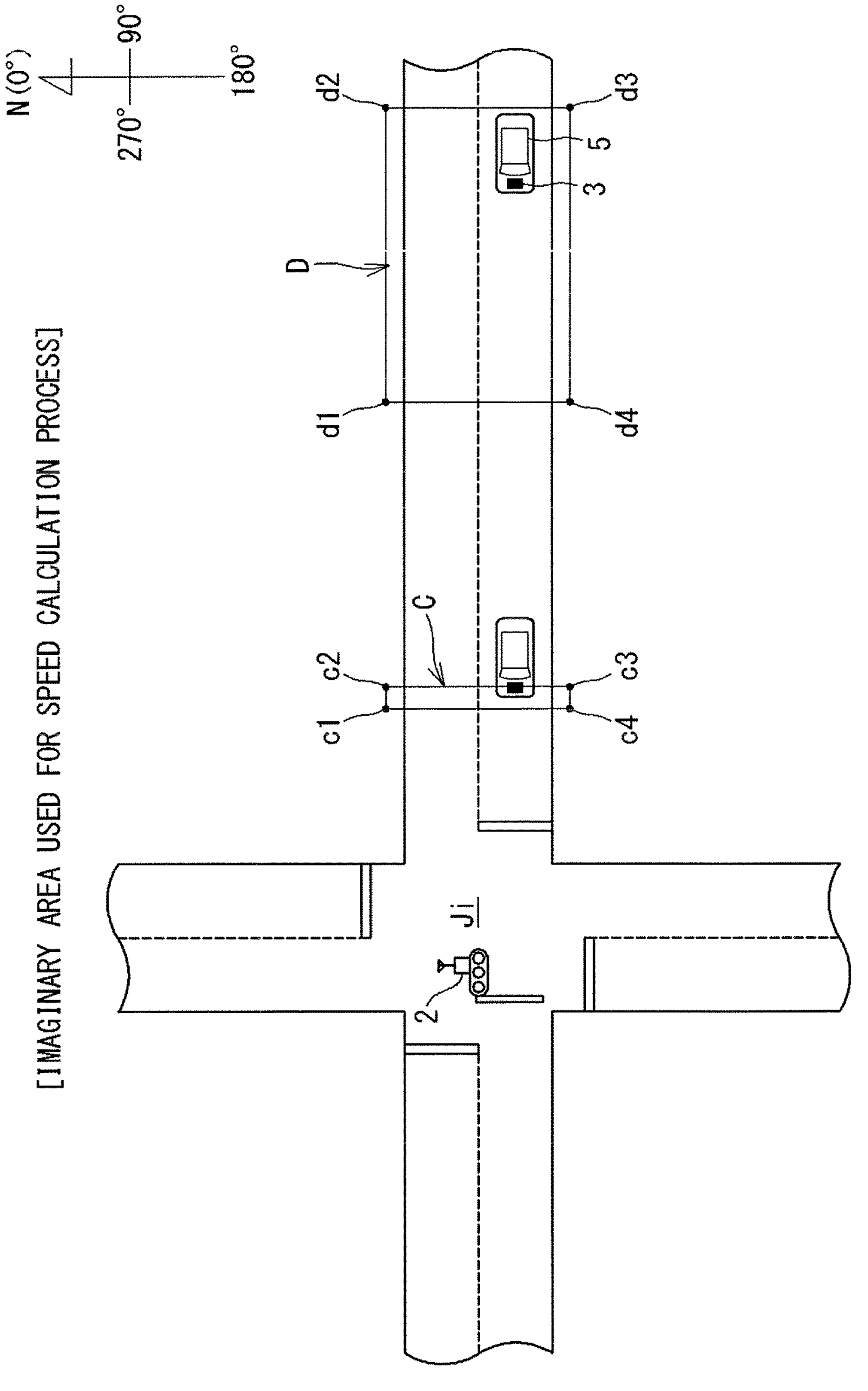
FIG. 8 is an explanatory diagram showing examples of imaginary areas used for a speed calculation process.

FIG. 8 is an explanatory diagram showing examples of imaginary areas C and D that the information processing unit 23B uses for a speed calculation process.

Assuming that one non-image-processing vehicle detector is installed on a road, the imaginary area C is an imaginary area corresponding to a detection area of the vehicle detector. Assuming that one image-processing vehicle detector is installed on a road, the imaginary area D is an imaginary area corresponding to a detection area (a road section included in an area photographable by a television camera) of the vehicle detector.

The imaginary area C is an imaginary area for calculating the instantaneous speed of a probe vehicle 5 traveling on a westward approach path among four approach paths to an intersection Ji, or the average speed of the probe vehicle 5 within a predetermined time period.

Therefore, the imaginary area C is an area enclosed by a rectangle having four vertexes c1 to c4 and positioned to the east side of the intersection Ji.

The imaginary area C has been set in the roadside relay device 2 in advance by causing the storage unit 24 of the roadside relay device 2 to store the coordinate values (latitudes and longitudes) of the vertexes c1 to c4.

The coordinate values of the four vertexes c1 to c4 (area information) of the imaginary area C are selected so as to satisfy the following conditions Z1 to Z3, for example.

Condition Z1: the latitudes of the vertex c1 and the vertex c2 are on the north side relative to the eastward exit path.

Condition Z2: the latitudes of the vertex c3 and the vertex c4 are on the south side relative to the westward approach path.

Condition Z3: the length of the imaginary area C in the vehicle advancing direction (the difference in longitude between the vertex c1 and the vertex c2 and the difference in longitude between the vertex c3 and the vertex c4) is less than or equal to half the average length (e.g., 4.5 m) of standard-size vehicles. In addition, the length of the imaginary area C is larger than or equal to the travel distance (2.0 m if an estimated speed is 20 msec) of a probe vehicle 5 corresponding to the reception cycle (e.g., 0.1 sec) of the probe information S5.

That is, the length of the imaginary area C in the vehicle advancing direction is less than the length of the imaginary area A (FIG. 5) in the same direction, and is about half the length of the imaginary area A.

In the case where the instantaneous speed of a probe vehicle 5 is calculated by using the imaginary area C, the information processing unit 23B executes the calculation process of FIG. 6 with respect to the imaginary area C.

When the result of the calculation process is that a probe vehicle 5 having a specific vehicle ID has passed through the imaginary area C, the information processing unit 23B extracts, from the probe information S5, the vehicle speed of the probe vehicle 5 corresponding to the passage position in the imaginary area C (the vehicle position existing in the imaginary area C). The information processing unit 23B regards the extracted vehicle speed as the instantaneous speed of the probe vehicle 5.

Instead of adopting the vehicle speed included in the probe information S5 (the vehicle speed measured by the vehicle 5) as it is, the information processing unit 23B may calculate the instantaneous speed of the probe vehicle 5 by using the vehicle positions and the temporal information included in a plurality of pieces of probe information S5.

Also when calculating the average speed of the probe vehicle 5 in a predetermined time period by using the imaginary area C, the information processing unit 23B executes the calculation process of FIG. 6 with respect to the imaginary area C.

When the result of the calculation process is that a probe vehicle 5 having a specific vehicle ID has passed through the imaginary area C, the information processing unit 23B extracts, from the storage unit 24, a plurality of pieces of probe information S5 each having the vehicle ID of the probe vehicle 5 that has passed through the imaginary area C, and having the temporal information within a predetermined time period (e.g., 5 sec). The information processing unit 23B regards the average value of the vehicle speeds included in the extracted plural pieces of probe information S5, as the average speed of the probe vehicle 5.

Instead of adopting the vehicle speeds included in the plurality of pieces of probe information S5 (the vehicle speed measured by the vehicle 5) as they are, the information processing unit 23B may calculate the average speed of the probe vehicle 5 in the predetermined time period by using the vehicle positions and the temporal information included in the plurality of pieces of probe information S5.

Further, the information processing unit 23B may calculate not only the average speed of the probe vehicle 5 in the predetermined time period but also other statistics such as a center value of the speed in the predetermined time period.

The imaginary area D is an imaginary area for calculating the average speed, in a predetermined distance, of a probe vehicle 5 traveling on the westward approach path among the four approach paths to the intersection Ji.

Therefore, the imaginary area D is an area enclosed by a rectangle having four vertexes d1 to d4 and positioned to the east side of the intersection Ji.

The imaginary area D has been set in the roadside relay device 2 in advance by causing the storage unit 24 of the roadside relay device 2 to store the coordinate values (latitudes and longitudes) of the vertexes d1 to d4.

The coordinate values (area information) of the four vertexes d1 to d4 of the imaginary area D are selected so as to satisfy the following conditions W1 to W3, for example.

Condition W1: the latitudes of the vertex d1 and the vertex d2 are on the north side relative to the eastward exit path.

Condition W2: the latitudes of the vertex d3 and the vertex d4 are on the south side relative to the westward approach path.

Condition W3: the length of the imaginary area D in the vehicle advancing direction (the difference in longitude between the vertex d1 and the vertex d2 and the difference in longitude between the vertex d3 and the vertex d4) substantially corresponds to a photographable road length (e.g., 150 to 200 m) when the road is photographed by an image-processing vehicle detector (television camera).

That is, the length of the imaginary area D in the vehicle advancing direction is significantly larger than the length of the imaginary area A (FIG. 5) in the same direction, and is sufficiently large for calculating the average speed in the predetermined distance.

Also when calculating the average speed of the probe vehicle 5 in the predetermined distance by using the imaginary area D, the information processing unit 23B executes the calculation process of FIG. 6 with respect to the imaginary area D.

When the result of the calculation process is that a probe vehicle 5 having a specific vehicle ID has entered the imaginary area D, the information processing unit 23B extracts, from the storage unit 24, a plurality of pieces of probe information S5 each having the vehicle ID, the vehicle position of which is included in the imaginary area D. The information processing unit 23B regards the average value of the vehicle speeds included in the extracted plurality of pieces of probe information S5, as the average speed of the probe vehicle 5.

Instead of adopting the vehicle speeds included in the plurality of pieces of probe information S5 (the vehicle speeds measured by the vehicle 5) as they are, the information processing unit 23B may calculate the average speed of the probe vehicle 5 in the predetermined distance by using the vehicle positions and the temporal information included in the plurality of pieces of probe information S5.

Further, the information processing unit 23B may calculate not only the average speed of the probe vehicle 5 in the predetermined distance but also other statistics such as a center value of the speed in the predetermined distance.

[Imaginary Pulse Signal Generation Process]

Figure 9A:
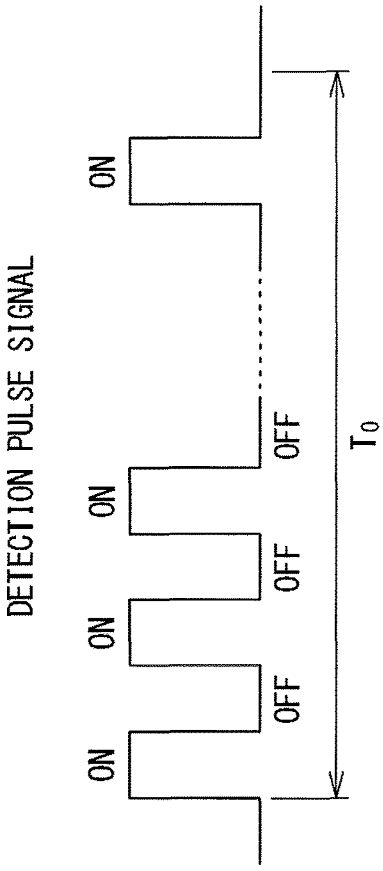
FIG. 9(*a*) is an explanatory diagram showing a detection pulse signal of a non-image-processing vehicle detector, and FIG. 9(*b*) is an explanatory diagram showing entry and exit timings of a probe vehicle with respect to an imaginary area.

FIG. 9(*a*) is an explanatory diagram showing a detection pulse signal of the non-image-processing vehicle detector. FIG. 9(*b*) is an explanatory diagram showing entry and exit timings of a probe vehicle 5 with respect to the imaginary area A. FIG. 10 is a flowchart showing an example of an imaginary pulse signal generation process that the information processing unit 23B executes.

As shown in FIG. 9(*a*), the detection pulse signal of the non-image-processing vehicle detector is a time-series pulse signal in which an "ON signal" that represents detection of a vehicle in the detection area and an "OFF signal" that represents detection of no vehicle in the detection area are repeated.

A rising edge of the ON signal occurs when a vehicle 5 enters the detection area, and a falling edge of the ON signal (start of the OFF signal) occurs when the vehicle 5 exits the detection area. An occupancy is a ratio of the total time of ON signals included in a predetermined measurement period T0 (e.g., 2 min) to the measurement period T0.

Therefore, in order to generate, on the basis of the imaginary area A and the vehicle position or the like included in the probe information S5, an emulated value of a detection pulse signal (hereinafter referred to as "imaginary pulse signal") and an occupancy based on this emulated value, it is necessary to calculate an entry time Tin of the probe vehicle 5 into the imaginary area A and an exit time Tout of the probe vehicle 5 from the imaginary area A, as shown in FIG. 9(*b*).

FIG. 10 shows a process of generating an imaginary pulse signal by using the imaginary area A, by calculating the above-mentioned entry time Tin and exit time Tout.

As shown in FIG. 10, upon newly receiving probe information S5 (step ST20), the information processing unit 23B of the roadside relay device 2 determines whether or not the vehicle ID included in the probe information S5 is a vehicle ID that has already entered the imaginary area A (step ST21).

The above determination process can be performed by, for example, providing the storage unit 24 with a memory region in which a vehicle ID is registered for only a predetermined time period (e.g., 10 sec), and determining whether or not the vehicle ID included in the newly received probe information S5 corresponds to the already registered vehicle ID.

When the result of the determination in step ST21 is positive, the information processing unit 23B shifts the processing to the determination process in step ST26.

When the result of the determination in step ST21 is negative, the information processing unit 23B further determines whether or not the vehicle heading of the probe vehicle 5, which is included in the received probe information S5, is within a predetermined heading range (step ST22).

In the example of generating a detection pulse signal for the westward approach path shown in FIG. 9(*a*) and FIG. 10, the above-mentioned determination process can be performed by determining whether or not the vehicle heading of the probe vehicle 5 is within a predetermined heading range (e.g.,±35° ) with the westward heading (=270° ) being a center value.

When the result of the determination in step ST22 is negative, the information processing unit 23B returns the processing to the step prior to step ST20.

When the result of the determination in step ST22 is positive, the information processing unit 23B further determines whether or not the vehicle position of the probe vehicle 5, which is included in the probe information S5, is inside the imaginary area A (step ST23).

The above-mentioned determination process can be performed by determining whether or not the coordinate values (e.g., latitude value=x, longitude value=y) of the vehicle position of the probe vehicle 5 satisfy the following inequalities:

latitude values of vertex al and vertex a2≤latitude value x≤latitude values of vertex a3 and vertex a4;

longitude values of vertex al and vertex a4≤longitude value y≤longitude values of vertex a2 and vertex a3.

When the result of the determination in step ST23 is negative, the information processing unit 23B returns the processing to the step prior to step ST20.

When the result of the determination in step ST23 is positive, the information processing unit 23B regards the latest temporal information for the vehicle ID included in the received probe information S5, as the entry time Tin into the imaginary area A, and sets the state of the imaginary pulse signal on and after this entry time Tin, to ON (step ST24).

Thereafter, the information processing unit 23B registers the vehicle ID included in the received probe information S5 into the memory region for the vehicle ID of the already-entered vehicle (step ST25), and returns the processing to the step prior to step ST20.

Meanwhile, also in the determination process at step ST26, the information processing unit 23B determines whether or not the vehicle position of the probe vehicle 5 included in the received probe information S5 is inside the imaginary area A (step ST26).

When the result of the determination in step ST26 is positive, the information processing unit 23B returns the processing to the step prior to ST20.

When the result of the determination in step ST26 is negative, the information processing unit 23B regards the latest temporal information for the vehicle ID included in the received probe information S5, as the exit time Tout from the imaginary area A, and sets the state of the imaginary pulse signal on and after this exit time Tout, to OFF (step ST27).

Thereafter, the information processing unit 23B unregisters the vehicle ID included in the received probe information S5 from the memory region for the vehicle ID of the already-entered vehicle (step ST28), and returns the processing to the step prior to step ST20.

As described above, upon execution of the calculation process of FIG. 10 by the information processing unit 23B, an imaginary pulse signal is generated, which emulates a detection pulse signal of a vehicle detector and is ON at the entry time Tin into the imaginary area A and OFF at the exit time Tout from the imaginary area A.

Therefore, by diving the total time of the imaginary pulse signals in the measurement period T0 by the time length of the measurement period T0, it is possible to calculate the occupancy of the probe vehicle 5 that has passed through the imaginary area A westward and enters the intersection Ji.

Figure 9B:
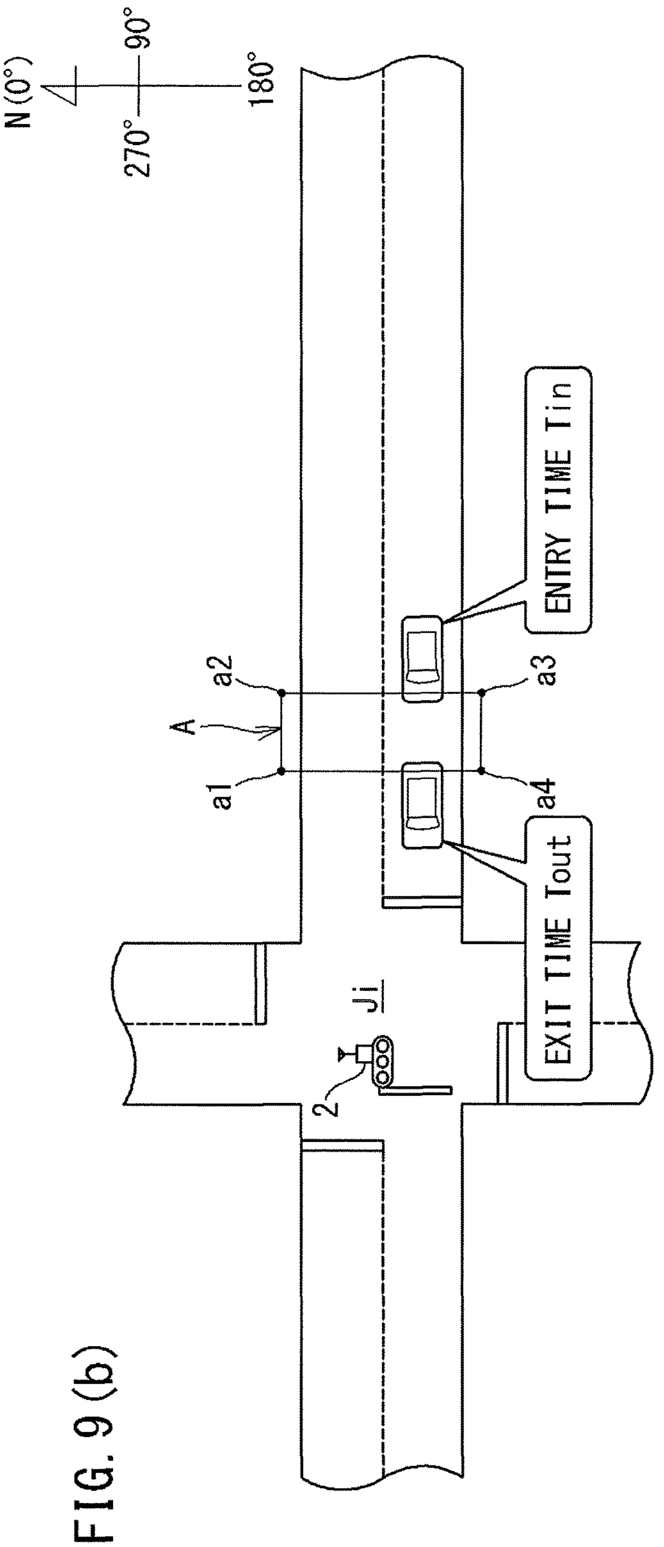
Figure 10:
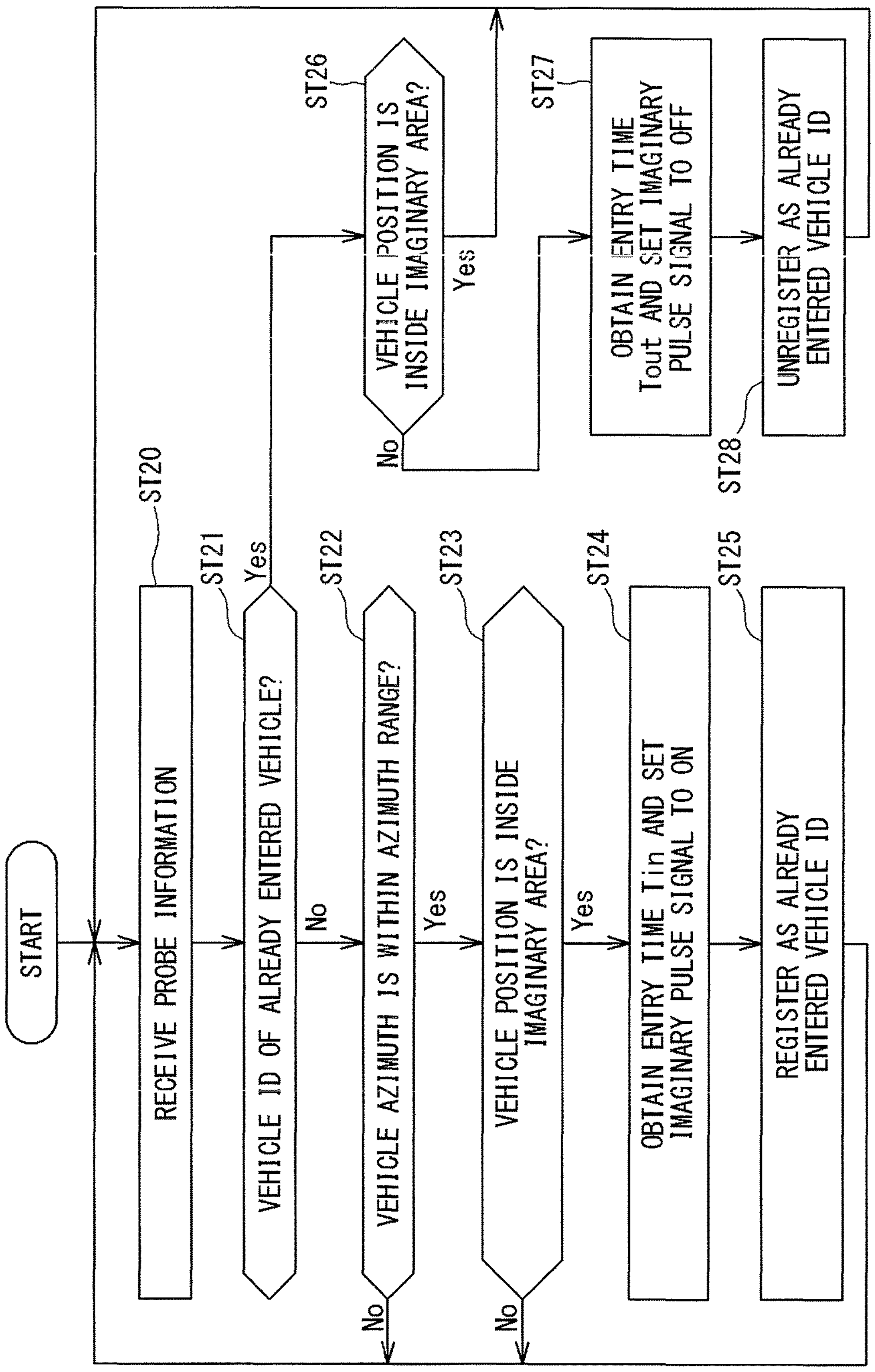
FIG. 10 is a flowchart showing an example of a detection pulse signal generation process.

While FIG. 9(b) shows the same imaginary area A as that shown in FIG. 5, the imaginary area C (refer to FIG. 8) shorter than the imaginary area A may be used to execute the imaginary pulse signal generation process (FIG. 10) and the occupancy calculation process using the generated imaginary pulse signal.

In the case of generating an imaginary pulse signal and occupancy for the eastward approach path, the southward approach path, or the northward approach path of the intersection Ji, the storage unit 24 may be caused to store an imaginary area having coordinate values positioned to the west side, north side, or south side of the intersection Ji, in a similar manner to that for the imaginary area A.

Then, a generation process similar to that shown in FIG. 10 may be executed by using the stored imaginary area for each approach direction to generate an imaginary pulse signal for each approach direction, and an occupancy for each approach direction may be calculated from the generated imaginary pulse signal.

[Vehicle position correcting process]

Figure 11A:
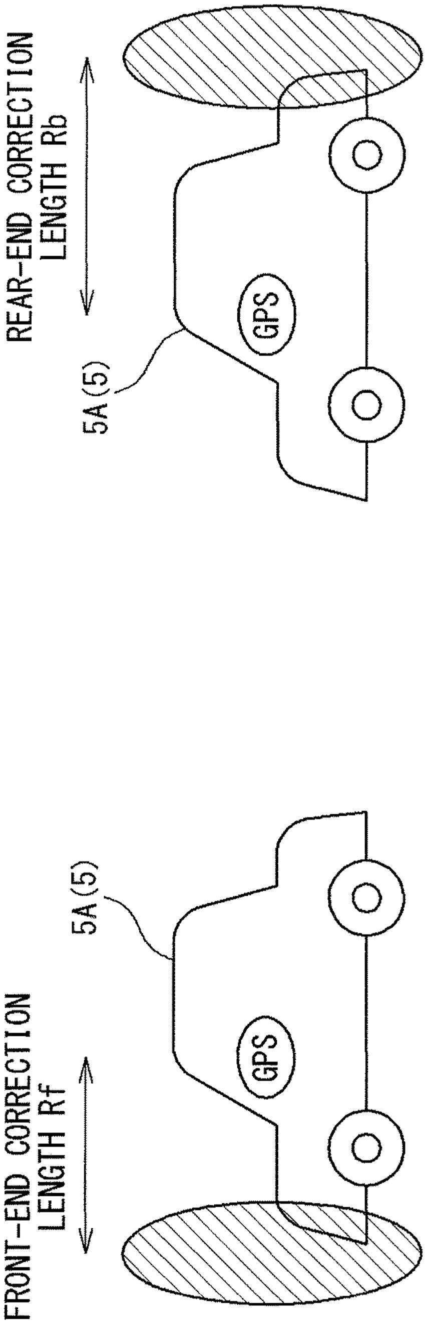
FIG. 11(*a*) and FIG. 11(*b*) are explanatory diagrams showing a front-end correction length and a rear-end correction length of a vehicle, wherein FIG. 11(*a*) shows the case of a standard-size vehicle, and FIG. 11(*b*) shows the case of a large-size vehicle.
Figure 11B:
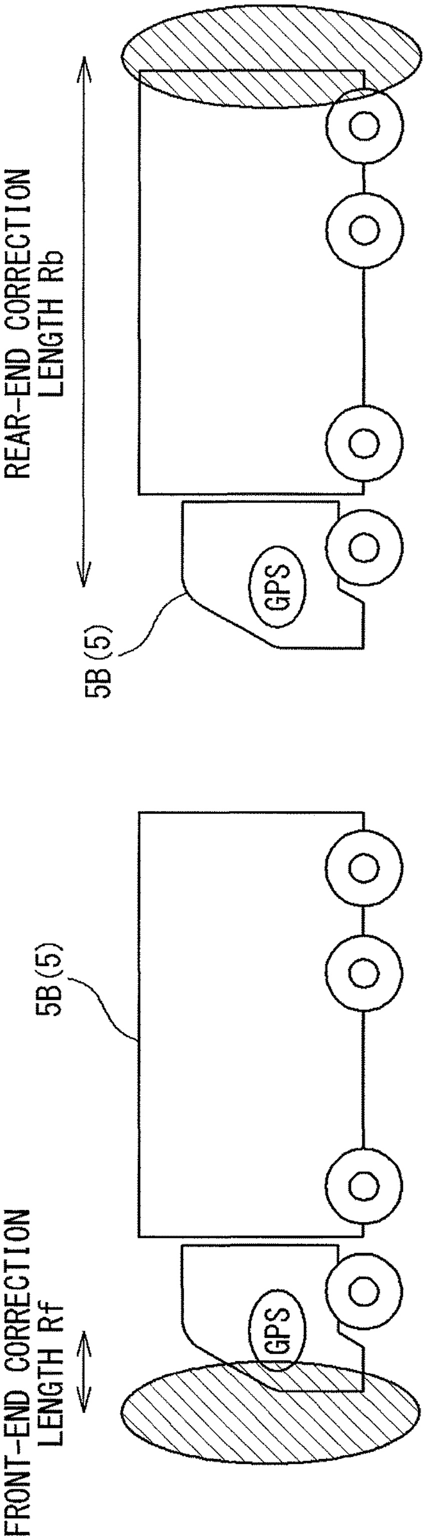

FIG. 11(*a*) and FIG. 11(*b*) are explanatory diagrams showing a front-end correction length Rf and a rear-end correction length Rb of a vehicle 5. FIG. 11(*a*) shows the case of a standard-size vehicle 5A, and FIG. 11(*b*) shows the case of a large-size vehicle 5B.

Usually, a detection pulse signal of a vehicle detector becomes an ON signal when a front end portion of a vehicle 5 enters a detection area, and becomes an OFF signal when a rear end portion of the vehicle 5 exits the detection area. That is, the time length of one ON signal corresponds to a time period from when the "front end portion" of the vehicle 5 enters the detection area to when the "rear end portion" of the vehicle 5 exits the detection area.

However, as shown in FIG. 11(*a*) and FIG. 11(*b*), the vehicle position included in the probe information S5 is the position of a GPS receiver (communication unit 31) of the on-vehicle communication apparatus 3.

Therefore, the entry time Tin and the exit time Tout shown in FIG. 9(*b*) are exactly the times when the GPS receiver enters and exits the imaginary area A, and are not the entry time of the front end portion of the probe vehicle 5 and the exit time of the rear end portion of the probe vehicle 5 with respect to the imaginary area A, respectively.

Therefore, in order to generate an imaginary pulse signal closer to an actual detection pulse signal, it is preferable to correct the vehicle position (the position of the GPS radio set) included in the probe information S5 to the front end position and the rear end position of the probe vehicle 5 in accordance with the entry and exit of the probe vehicle 5 with respect to the imaginary area A, in the imaginary pulse signal generation process shown in FIG. 10.

Specifically, when determining whether or not the probe vehicle 5 enters the imaginary area A (step ST23 in FIG. 10), the information processing unit 23B may adopt coordinate values obtained by adding a predetermined front-end correction length Rf to the vehicle position included in the probe information S5.

Further, when determining whether or not the probe vehicle 5 exits the imaginary area A (step ST26 in FIG. 10), the information processing unit 23B may adopt coordinate values obtained by subtracting a predetermined rear-end correction length Rb from the vehicle position included in the probe information S5.

By so doing, even if the GPS receiver is installed near a seat of the probe vehicle 5 (e.g., inside or above a dashboard), it is possible to accurately calculate the front end position and the rear end position of the probe vehicle 5.

Therefore, as compared to the case where the above-mentioned correction lengths Rf and Rb are not considered, accurate entry time Tin and exit time Tout with respect to the imaginary area A can be obtained, whereby the imaginary pulse signal can be generated more accurately.

Further, as shown in FIG. 11(*a*), in the case of the standard-size vehicle 5A, the mounting position of the GPS receiver is substantially near the center of the vehicle length. As shown in FIG. 11(*b*), in the case of the large-size vehicle 5B, the mounting position of the GPS receiver is substantially near the front end portion of the vehicle length.

Thus, depending on the type (5A, 5B) of the probe vehicle 5, the values of the front-end correction length Rf and the rear-end correction length Rb to be applied to the probe vehicle 5 vary.

So, in the case where the vehicle length and the vehicle type of the probe vehicle 5 are included in the probe information S5, it is preferable to change the values of the front-end correction length Rf and the rear-end correction length Rb to be applied, in accordance with the vehicle length and the vehicle type extracted from the probe information S5.

By so doing, the front end position and the rear end position of the probe vehicle 5 can be accurately estimated, as compared to the case where the front-end correction length Rf and the rear-end correction length Rb are set to fixed values without considering the vehicle length and the vehicle type of the probe vehicle 5.

Thus, more accurate entry time Tin and exit time Tout with respect to the imaginary area A can be obtained, whereby the imaginary pulse signal can be generated more accurately.

[Branching Rate Calculation Process]

Figure 12:
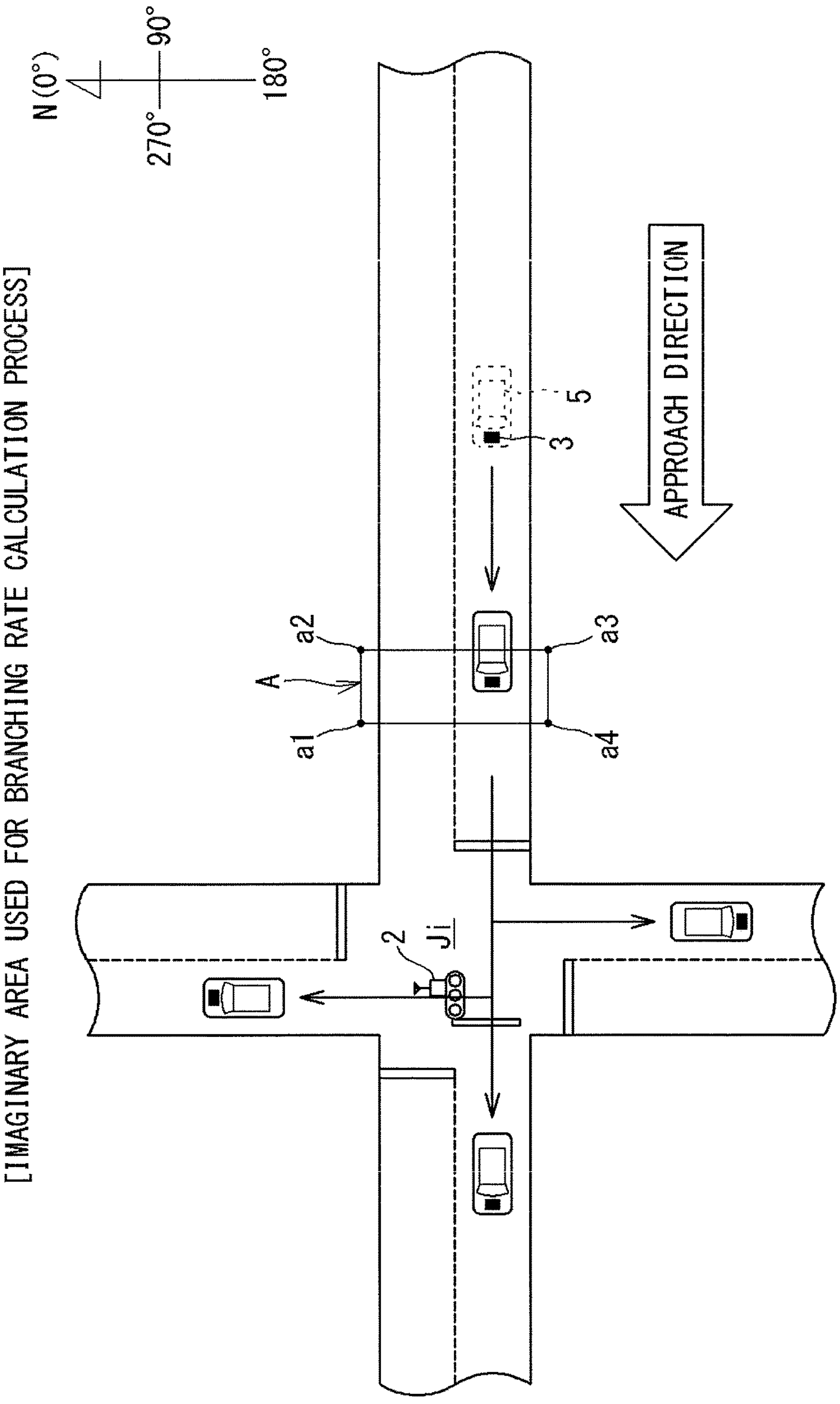
FIG. 12 is an explanatory diagram showing an example of an imaginary area used for a branching rate calculation process.

FIG. 12 is an explanatory diagram showing an example of an imaginary area A used for a branching rate calculation process that the information processing unit 23B executes. The imaginary area A shown in FIG. 12 is identical to the imaginary area A shown in FIG. 5.

When calculating the branching rate of a probe vehicle 5 by using one imaginary area A, the information processing unit 23B executes the calculation process of FIG. 6 with respect to the imaginary area A.

When the result of the calculation process is that a probe vehicle 5 having a specific vehicle ID has passed through the imaginary area A, the information processing unit 23B tracks the outgoing direction of the probe vehicle 5 having the vehicle ID on the basis of the vehicle heading after the probe vehicle 5 has passed through the intersection Ji.

Specifically, the information processing unit 23B classifies the outgoing direction, at the intersection Ji, of each probe vehicle 5 that has passed through the imaginary area A within a predetermined time period, and accumulates the number of vehicles for each approach direction on the basis of the result of the classification.

Thereafter, the information processing unit 23B divides the number of vehicles in each approach direction by the number of vehicles that have passed through the imaginary area A (traffic volume), thereby calculating the branching rate for each approach direction.

While FIG. 12 shows the same imaginary area A as that shown in FIG. 5, the imaginary area C (refer to FIG. 8) shorter than the imaginary area A or the imaginary area D (refer to FIG. 8) longer than the imaginary area A may be used for calculation of the branching rate.

In the case of calculating the branching rate for the eastward approach path, the southward approach path, or the northward approach path of the intersection Ji, an imaginary area having coordinate values and positioned to the west side, the north side, or the south side of the intersection Ji may be stored in the storage unit 24.

Then, a calculation process similar to that described above may be executed by using the stored imaginary area for each approach direction.

[Imaginary Area Setting Process]

Figure 13:
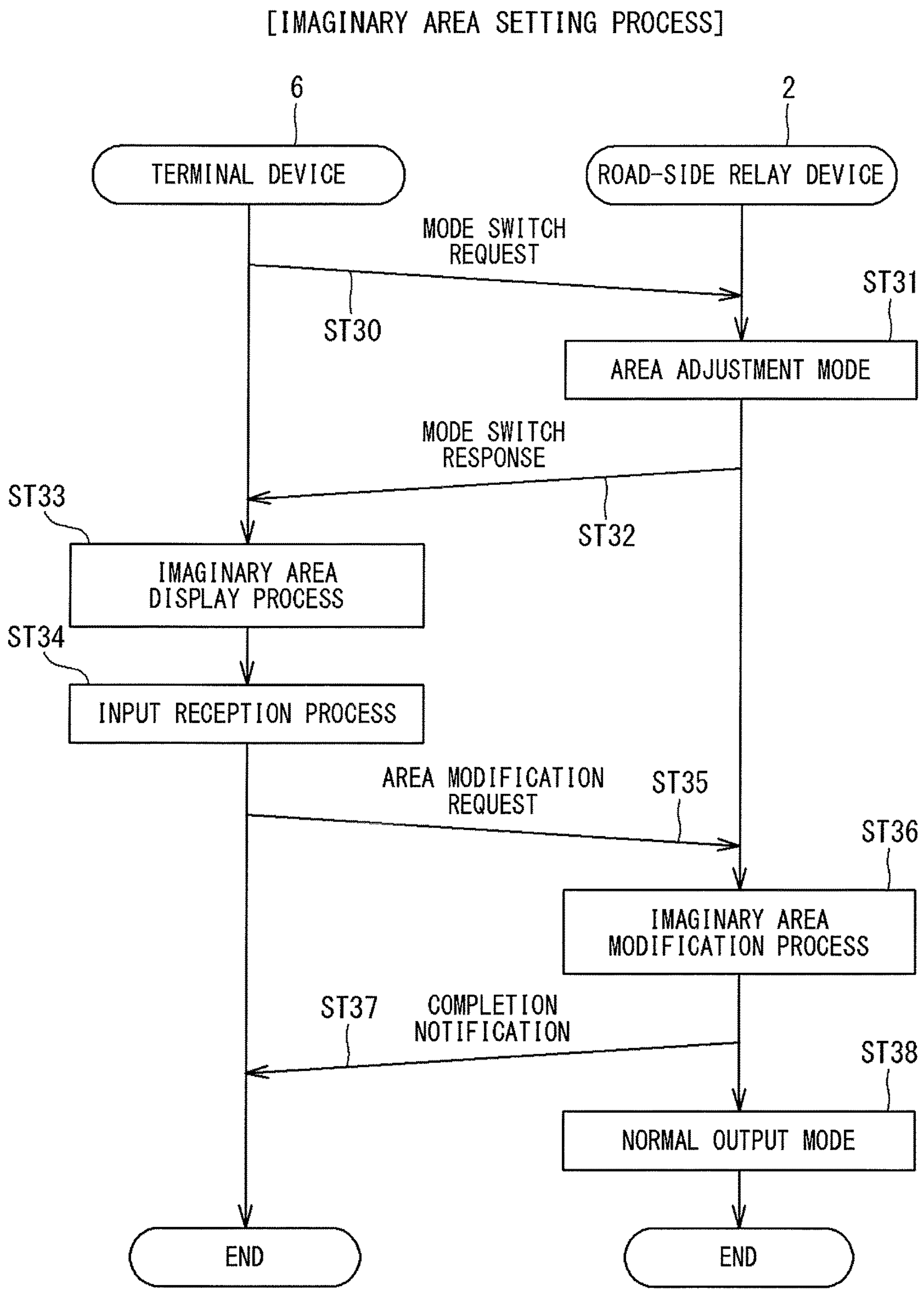
FIG. 13 is a sequence diagram showing an example of a communication procedure between a terminal device and a roadside relay device in the case of setting an imaginary area in the roadside relay device by using the terminal device.

FIG. 13 is a sequence diagram showing an example of a communication procedure between the terminal device 6 and the roadside relay device 2 in the case of setting the imaginary areas A to D in the roadside relay device 2 by using the terminal device 6.

While in FIG. 13, the "terminal device 6" and the "roadside relay device 2" are processing subjects, actual processing subjects are the control unit 61 of the terminal device 6 and the information processing unit 23B of the roadside relay device 2.

As shown in FIG. 13, the roadside relay device 2 is able to execute an "area adjustment mode" (step ST31) and a "normal output mode" (step ST38) as switchable operation modes.

The area adjustment mode is an operation mode that allows the positional information (e.g., the coordinate values of the vertexes) of the imaginary areas A to D to be modified. The normal output mode is an operation mode that does not allow the positional information of the imaginary areas A to D to be modified, and generates a traffic index on the basis of the stored positional information.

In the communication procedure shown in FIG. 13, first, the terminal device 6 transmits a communication frame of a mode switch request to the roadside relay device 2 (step ST30).

Upon receiving the communication frame, the roadside relay device 2 switches the operation mode thereof to the area adjustment mode (step ST31), and thereafter sends a communication frame of a mode switch response to the terminal device 6 (step ST32). This communication frame includes the positional information of the imaginary areas A to D stored in the roadside relay device 2.

Upon receiving the communication frame, the terminal device 6 executes a process of displaying the current imaginary areas A to D on the display unit 64, on the basis of the positional information included in the communication frame (step ST33).

Specifically, the terminal device 6 superposes the imaginary areas A to D on a road map including an intersection Ji by using the positional information included in the received frame, and causes the display unit 64 to display the road map including the imaginary areas A to D (e.g., the road map as shown in FIG. 5 or FIG. 7).

Next, the terminal device 6 executes a process of receiving an input performed by a user to the operation unit 66 (step ST34). This input reception process is a process of receiving, by the operation unit 66, an input of the positional information of the imaginary areas A to D.

For example, the user can input the positional information of the imaginary areas A to D by inputting the coordinate values of the vertexes through a keyboard operation, or by moving, extending, or reducing the diagrams of the imaginary areas A to D through a predetermined touch operation onto the operation unit 66.

When the user has completed the input of the positional information of the imaginary areas A to D, the terminal device 6 transmits a communication frame of an area modification request to the roadside relay device 2 (step ST35). This communication frame includes the positional information of the imaginary areas A to D modified by the input of the user.

Upon receiving the communication frame, the roadside relay device 2 executes the process of modifying the imaginary areas A to D by using the positional information included in the received frame (step ST36). Specifically, the roadside relay device 2 updates the positional information of the imaginary areas A to D to the obtained positional information.

Next, the roadside relay device 2 transmits, to the terminal device 6, a communication frame of a completion notification that notifies completion of the modification of the imaginary areas A to D (step ST37). Upon receiving this communication frame, the terminal device 6 ends the communication procedure with the roadside relay device 2.

In addition, the roadside relay device 2 switches the operation mode thereof to the normal output mode, and then ends the communication procedure with the terminal device 6.

The process of setting the imaginary areas A to D shown in FIG. 13 can also be used when setting new imaginary areas A to D or when changing the imaginary areas A to D.

While in the example shown in FIG. 13, the imaginary areas A to D are set in the roadside relay device 2 by using the terminal device 6, setting of the imaginary areas A to D may be performed from the central apparatus 4 through a similar communication procedure performed between the central apparatus 4 and the roadside relay device 2.

[Transmission Object Determining Process]

Figure 14:
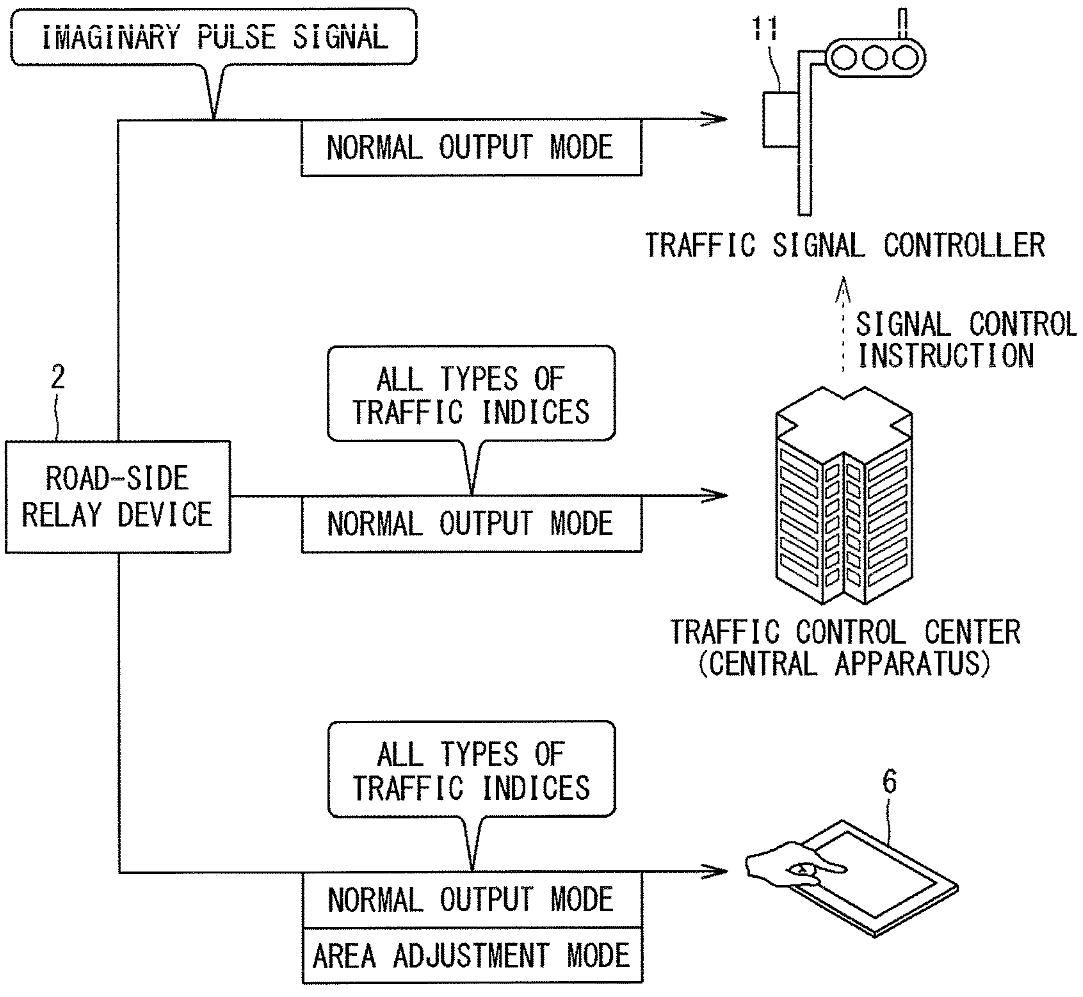
FIG. 14 is an explanatory diagram showing an example of a traffic index outputting process by the roadside relay device.

FIG. 14 is an explanatory diagram showing an example of a transmission object determination process performed by the roadside relay device 2.

While in FIG. 14, the "roadside relay device 2" is a processing subject, an actual processing subject is the data relay unit 23A of the roadside relay device 2.

As shown in FIG. 14, the roadside relay device 2 is able to determine whether or not each of traffic indices is to be a transmission object, depending on the kind of each traffic index, and is also able to determine a transmission object for each of external apparatuses as transmission destinations, depending on the type of each external apparatus.

For example, the roadside relay device 2 transmits, to the traffic signal controller 11, only the imaginary pulse signal among the generated traffic indices.

The reason is as follows. The traffic signal controller 11 is able to calculate the traffic volume on an approach path from the imaginary pulse signal and execute local-actuated control (e.g., right-turn-actuated control or the like) on the basis of the traffic volume, but in many cases, does not execute traffic-actuated control using the speed, the travel time, or the like.

The roadside relay device 2 transmits all the kinds of traffic indices to the central apparatus 4.

The reason is as follows. The central apparatus 4 is able to execute traffic-actuated control for a plurality of intersections Ji, such as the above-mentioned coordinated control and area traffic control. That is, the traffic-actuated control performed by the central apparatus 4 needs, in many cases, the travel time in a road section, the branching rate at an intersection, and the like. Therefore, it is preferable to transmit all the kinds of traffic indices to the central apparatus 4.

However, in many cases, the central apparatus 4 is able to calculate various kinds of traffic indices such as a traffic volume, an occupancy, and the like from a detection pulse signal of the conventional non-image-processing vehicle detector. Therefore, only the imaginary pulse signal may be transmitted to the central apparatus 4.

In this case, since the amount of information transmitted from the roadside relay device 2 to the central apparatus 4 is reduced, the communication line 7 can be prevented from being tightened.

The roadside relay device 2 transmits all the kinds of generated traffic indices to the terminal device 6.

The reason is as follows. If the roadside relay device 2 transmits all the kinds of traffic indices generated by the roadside relay device 2 to the terminal device 6, a traffic engineer as a user of the terminal device 6 can check the adequacies of all the kinds of traffic indices displayed on the terminal device 6.

As shown in FIG. 14, the roadside relay device 2 transmits, only in the normal output mode, the generated traffic indices to the traffic signal controller 11 and the central apparatus 4.

The reason is as follows. Since accurate traffic indices have not yet been obtained in the stage of adjusting the imaginary areas A to D, the traffic indices should not be transmitted to the traffic signal controller 11 and the central apparatus 4.

The roadside relay device 2 transmits the generated traffic indices to the terminal device 6 in both the normal output mode and the area adjustment mode.

The reason is as follows. If the traffic indices are transmitted to the terminal device 6 in both the normal output mode and the area adjustment mode, the traffic engineer can check the traffic indices before and after adjustment of the imaginary areas A to D, and therefore can check the adequacy of modification to the imaginary areas A to D.

[Effect of Roadside Relay Device]

According to the roadside relay device 2 of the present embodiment, the information processing unit 23B generates the traffic indices on the basis of: the positional information (area information) of the imaginary areas A to D, which is stored in the storage unit 24; and the probe information S5 received by the wireless communication unit 21 (refer to FIG. 5 to FIG. 12).

Therefore, even when a vehicle detector is not actually installed, it is possible to generate traffic indices of the same kinds as those obtained when a vehicle detector is installed, whereby the traffic indices can be collected at low costs.

According to the roadside relay device 2 of the present embodiment, the information processing unit 23B generates at least one of the traffic volume, the imaginary pulse signal, and the occupancy (refer to FIG. 5, FIG. 6, and FIG. 9(*a*) to FIG. 11(*b*)), it is possible to almost completely emulate the traffic indices that the conventional non-image-processing vehicle detector generates.

Therefore, the central apparatus 4, which is configured to execute traffic signal control by using the traffic indices generated by the non-image-processing vehicle detector, can execute the same traffic signal control by using the traffic indices generated by the roadside relay device 2, without the necessity of changing the control program that has been used.

According to the roadside control device 2 of the present embodiment, the information processing unit 23B does not generate traffic indices when an angular difference between the vehicle heading and the road heading exceeds a predetermined value, and generates traffic indices when the angular difference is less than or equal to the predetermined value (step ST12 in FIG. 6, and step ST22 in FIG. 10).

Therefore, it is possible to prevent in advance erroneous generation of traffic indices of a probe vehicle 5 estimated to travel on, for example, an opposing lane, which may cause the angular difference between the vehicle heading and the road heading to exceed the predetermined value.

According to the roadside relay device 2 of the present embodiment, the wireless communication unit 21 is able to receive the positional information of the imaginary areas A to D from the terminal device 6, and the information processing unit 23B causes the storage unit 24 to store the positional information of the imaginary areas received by the wireless communication unit 21 (refer to FIG. 13).

Therefore, the positional information of the imaginary areas A to D can be set in the roadside relay device 2 by remote control using the terminal device 6, which facilitates the work for setting the positional information of the imaginary areas A to D.

In the roadside relay device 2 of the present embodiment, the wireless communication unit 21 is able to receive the positional information of the imaginary areas A to D from the terminal device 6, and the information processing unit 23B updates the positional information of the imaginary areas A to D stored in the storage unit 24 to the positional information of the imaginary areas A to D received by the wireless communication unit 21 (refer to FIG. 13).

Therefore, the positional information of the imaginary areas A to D set in the roadside relay device 2 can be updated by remote control using the terminal device 6, which facilitates the work for updating the positional information of the imaginary areas A to D.

[First Modification]

In the above embodiment, the imaginary areas A to D each are set to have a width dimension including a road width therein. However, the imaginary areas A to D may be individually set for each approach path or may be individually set for each lane, in accordance with GPS positioning accuracy.

In the case where the imaginary areas A to D are set for each approach path or each lane, determination of the approach direction on the basis of the vehicle heading (e.g., step ST12 in FIG. 6) is not necessary.

[Second Modification]

In the above embodiment, the rectangular imaginary areas A to D are exemplified. However, the shape of the imaginary areas A to D may be a polygon other than rectangle, or may be a shape including a curve, such as circle or ellipse.

In the case of a circular or elliptic imaginary area, area information of the imaginary area can be defined by coordinate values of a center point, and a value of a radius or values of major and minor diameters, and the position and size of the imaginary area can be set on the basis of the area information.

In the above embodiment, the two-dimensionally extending imaginary areas A to D are exemplified. However, a three-dimensionally extending imaginary space may be adopted as an imaginary area on a coordinate system which emulates a detection area.

Such an imaginary space can be set in the roadside relay device 2 by, for example, further adding coordinate values of an altitude. Adopting the imaginary space enables discrimination between an elevated road such as a freeway and an ordinary road on a flat land. Therefore, there is an advantage that traffic indices for at least one of the elevated road and the ordinary road can be generated by using an imaginary space that is set on a road section, of the ordinary road, which overlaps the elevated road directly above the ordinary road.

In the above embodiment, the two-dimensionally extending imaginary areas A to D are exemplified. However, a one-dimensional imaginary line segment that crosses a road may be adopted as an imaginary area on a coordinate system, which emulates a detection area.

In the case of adopting such an imaginary line segment, special processing is required, such as converting each probe vehicle 5 into an imaginary moving object composed of not a point but, for example, a line segment equivalent to the vehicle length including the vehicle position or into an imaginary moving object composed of a line segment connecting the current vehicle position and the previous vehicle position, and then detecting passing of the vehicle by intersection of the imaginary moving object and the imaginary line segment.

Meanwhile, in the case of adopting, as an imaginary area on a coordinate system, a two-dimensionally extending imaginary area or a three-dimensionally extending imaginary space, passing of a probe vehicle 5 can be detected depending on whether or not the vehicle position of the probe vehicle 5 is included in the imaginary area or the imaginary space. Therefore, the above-mentioned special processing is not necessary.

Thus, there is an advantage that the processing load on the roadside relay device 2, which generates traffic indices, can be reduced as compared to the case of adopting the one-dimensional imaginary line segment.

[Imaginary Area Corresponding to the Type of Local-Actuated Control]

Figure 15:
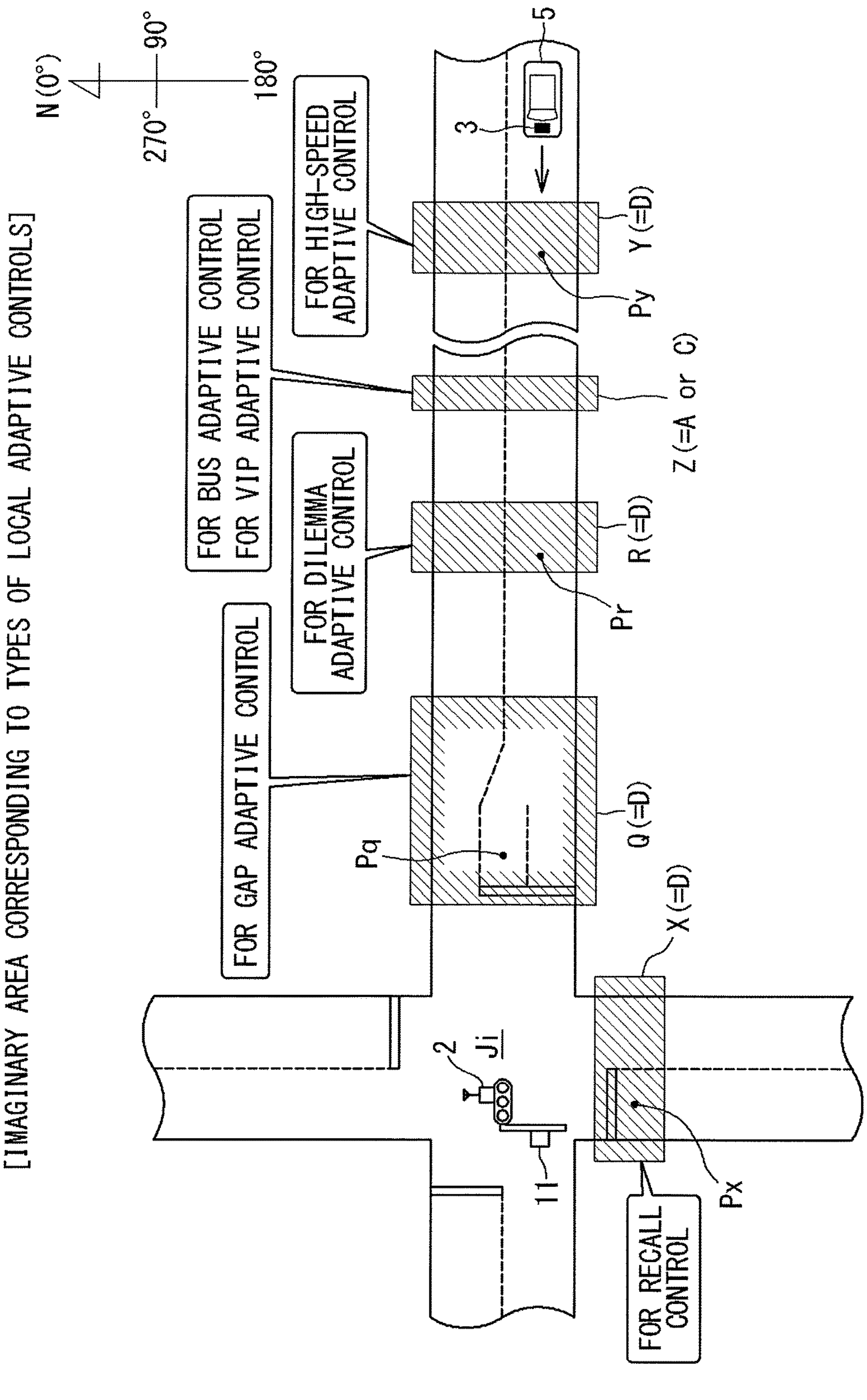
FIG. 15 is an explanatory diagram showing examples of imaginary areas corresponding to different types of local-actuated controls.

FIG. 15 is an explanatory diagram showing examples of imaginary areas Q to Z corresponding to different types of local-actuated controls that a traffic signal controller 11 at an intersection Ji can execute.

While the roadside relay device 2 shown in FIG. 14 transmits only the imaginary pulse signal to the traffic signal controller 11, the roadside relay device 2 shown in FIG. 15 can transmit information other than the imaginary pulse signal, such as the vehicle speed and the vehicle type, to the traffic signal controller 11.

"Local-actuated control" is a control in which the traffic signal controller 11 itself is operated to extend and reduce green interval or the like in response to traffic change in each cycle, on the basis of information obtained from various types of detectors (non-image-processing vehicle detector, image-processing vehicle detector, and the like) connected to the traffic signal controller 11.

Examples of the types of the local-actuated control executable by the traffic signal controller 11 include: gap-actuated control; dilemma-actuated control; recall control; high-speed-actuated control; bus-actuated control; and VIP-actuated control.

The "gap-actuated control" is an actuated control in which a unit extension time is recounted every time a vehicle is detected, and a gap of vehicles (time headway) is detected upon completion of the counting, whereby green phase interval is extended or reduced so as to meet traffic demands.

"Right-turn-actuated control" is a kind of the gap-actuated control, in which a vehicle detector is installed at an intersection where a right-turn lane is provided, and green-arrow time enough to meet traffic demands of right-turn vehicles is provided.

The "dilemma-actuated control" is a control aimed to reduce the risk of traffic accident by avoiding a zone (dilemma zone) in which, when yellow light is presented to a vehicle 5 that attempts to enter an intersection, a driver of the vehicle 5 is caught in dilemma between stopping and passing. The dilemma-actuated control is applied to an intersection where many rear-end collision accidents and upon-meeting collision accidents occur. There are two control methods as follows:

1) a method of variably controlling the yellow and all-red time interval in accordance with the approaching speed of a vehicle; and 2) a method of compulsorily switching the traffic light from green to yellow when no vehicle exists in the dilemma zone within a reduction/extension adaptive range with respect to standard green time.

The "recall control" is an actuated control in which, when a crossing request, which is made by a pedestrian pushbutton switch being pressed, is detected or when a vehicle is detected by a vehicle detector, green light is presented to the pedestrian or the vehicle to give time required for crossing or passing. Since green light is "recalled" upon a request while red light is usually displayed, this control is called "recall" control.

The "high-speed-actuated control" is an actuated control in which green interval is reduced or red interval is extended by a traffic signal controller at an intersection, for vehicles traveling at high speeds in the night or the like, thereby to suppress the speeds of the high-speed traveling vehicles.

The "bus-actuated control" is an actuated control in which a bus detector (e.g., an optical beacon as a non-image-processing vehicle detector that performs narrow-band optical communication with buses) is provided in front of an intersection to recognize a bus from among traveling vehicles, and green interval is extended or red interval is reduced in response to detection of the bus, thereby to reduce the traffic-light waiting time of the bus.

The "VIP-actuated control" is an actuated control corresponding to the case where the recognition target of the bus-actuated control is changed to a VIP (Very Important Person) vehicle. Also in the VIP-actuated control, green interval is extended or red interval is reduced in response to detection of a VIP vehicle, thereby to reduce the traffic-light waiting time of the VIP vehicle.

The storage unit 24 of the roadside relay device 2 stores therein area information (coordinate values or the like) of at least two imaginary areas, among the plurality of imaginary areas Q to Z shown in FIG. 15, which correspond to detection areas required for each of the types of local-actuated controls that the traffic signal controller 11 at the intersection Ji can execute.

The control unit 23 of the roadside relay device 2 generates, on the basis of a plurality of pieces of area information and probe information S5, traffic indices required for each of the types of local-actuated controls, and the wired communication unit 22 of the roadside relay device 2 transmits, to the traffic signal controller 11, the generated traffic indices for each of the types of local-actuated controls.

In FIG. 15, the imaginary area Q is an imaginary area corresponding to a detection area of a vehicle detector, which is required when the traffic signal controller 11 at the intersection Ji executes the gap-actuated control on the westward approach path.

When the traffic signal controller 11 executes the gap-actuated control, it is preferable to adopt, as the imaginary area Q to be stored in the roadside relay device 2, the imaginary area D corresponding to a road length (e.g., 30 to 75 m) of a measurement area of an image-processing vehicle detector used for the gap-actuated control.

For example, when the gap-actuated control is the right-turn-actuated control, the roadside relay device 2 may cause the storage unit 24 to store, as area information of the imaginary area Q for gap-actuated control, the area information on the coordinate system of the imaginary area D corresponding to a measurement area that has a downstream end roughly matching a stop line and has an upstream end about 30 m apart from the stop line. When the gap-actuated control is performed on a straight-through lane, since the speed of the control target (straight-through vehicle) is higher than that of a right-turn vehicle, the imaginary area Q (=D) is further extended toward the upstream side. The extension distance may be, for example, the estimated speed (speed per second) of the vehicle 5×3 seconds.

In this case, assuming that the estimated speed is 15 m/s (≈54 km/h), the extension distance from the stop line to the upstream side is 15×3=45 m. Therefore, in the case of the gap-actuated control on the straight-through lane, the area information of the imaginary area Q (=D) should be set so that the extension distance on the road from the stop line becomes about 45 m.

The control unit 23 of the roadside relay device 2 which stores the imaginary area D as the imaginary area Q for gap-actuated control, determines whether or not a probe vehicle 5 is present in the imaginary area Q (=D) on the basis of the area information of the imaginary area Q (=D) and the probe information S5, and generates an imaginary pulse signal representing presence/absence of a probe vehicle 5 by means of ON/OFF.

The wired communication unit 22 of the roadside relay device 2 transmits the generated imaginary pulse signal to the traffic signal controller 11, and the traffic signal controller 11 executes the gap-actuated control by using the received imaginary pulse signal.

In the case where operation information expressing ON or OFF of a direction indicator is included in the probe information S5, for example, the right-turn-actuated control may be executed only on a probe vehicle 5 that has transmitted the probe information S5 in which the operation information is ON, thereby to ignore a probe vehicle 5 that is estimated to be less likely to turn rightward.

The imaginary area Q for the gap-actuated control is preferably the imaginary area D corresponding to the measurement area of the image-processing vehicle detector, but may be the imaginary area A or C corresponding to a non-image-processing vehicle detector, depending on the operational convenience or the like.

In this case, the storage unit 24 may be caused to store, as the area information of the imaginary area Q for gap-actuated control, the area information of the imaginary area A or C corresponding to the detection area of the non-image-processing vehicle detector, which includes a point Pq apart from the stop line by a predetermined distance.

The control unit 23 of the roadside relay device 2 which stores the imaginary area A or C as the imaginary area Q for gap-actuated control, determines whether or not a probe vehicle 5 is present in the imaginary area Q (=A or C) on the basis of the area information of the imaginary area Q (=A or C) and the probe information S5, and generates an imaginary pulse signal representing presence/absence of a probe vehicle 5 by means of ON/OFF.

The wired communication unit 22 of the roadside relay device 2 transmits the generated imaginary pulse signal to the traffic signal controller 11, and the traffic signal controller 11 executes the gap-actuated control by using the received imaginary pulse signal.

In FIG. 15, the imaginary area R is an imaginary area corresponding to a detection area of a vehicle detector, which is required when the traffic signal controller 11 at the intersection Ji executes the dilemma-actuated control on the westward approach path.

When the traffic signal controller 11 executes the dilemma-actuated control, it is preferable to adopt, as the imaginary area R to be stored in the roadside relay device 2, the imaginary area D corresponding to a road length (e.g., 30 to 50 m) of a measurement area of an image-processing vehicle detector used for the dilemma-actuated control.

For example, the storage unit 24 may be caused to store, as area information of the imaginary area R for dilemma-actuated control, the area information of the imaginary area D corresponding to the measurement area having the above-mentioned road length (e.g., 30 to 50 m) and including a point Pr about 150 m apart from the stop line.

The control unit 23 of the roadside relay device 2 which stores the imaginary area D as the imaginary area R for dilemma-actuated control, calculates the average speed of a probe vehicle 5 in a predetermined distance from entry into the imaginary area R (=D) to exit therefrom, on the basis of the area information of the imaginary area R (=D) and the probe information S5. The control unit 23 regards the calculated average speed as the vehicle speed at the point Pr.

The wired communication unit 22 of the roadside relay device 2 transmits the calculated vehicle speed at the point Pr to the traffic signal controller 11, and the traffic signal controller 11 executes the dilemma-actuated control by using the received vehicle speed.

The imaginary area R for dilemma-actuated control is preferably the imaginary area D corresponding to the measurement area of the image-processing vehicle detector, but may be the imaginary area C corresponding to a detection area of a non-image-processing vehicle detector, depending on the operational convenience or the like.

In this case, the storage unit 24 may be caused to store, as the area information of the imaginary area R for dilemma-actuated control, the area information of the imaginary area C corresponding to the detection area of the non-image-processing vehicle detector, which includes the point Pr apart from the stop line by about 150 m.

The control unit 23 of the roadside relay device 2 which stores the imaginary area C as the imaginary area R for dilemma-actuated control, calculates the instantaneous speed of the probe vehicle 5 at the moment when the probe vehicle 5 passes through the imaginary area R (=C), on the basis of the area information of the imaginary area R (=C) and the probe information S5. The control unit 23 regards the calculated instantaneous speed as the vehicle speed at the point Pr.

The wired communication unit 22 of the roadside relay device 2 transmits the calculated vehicle speed at the point Pr to the traffic signal controller 11, and the traffic signal controller 11 executes the dilemma-actuated control by using the received vehicle speed.

Regarding the vehicle speed (instantaneous speed) of the probe vehicle 5 at the moment of passing through the imaginary area R, the vehicle speed included in the probe information S5 (the vehicle speed measured by the vehicle 5) may be adopted as it is, or a speed value calculated from vehicle positions and temporal information included in a plurality of pieces of probe information S5 may be adopted.

Communication regarding the vehicle speed from the roadside relay device 2 to the traffic signal controller 11 is executed by any one of communication methods including IP communication, serial communication, and parallel communication.

In the case where the vehicle speed is transmitted by the parallel communication (pulse), the values of pulse lengths (seconds) for different ranges of the vehicle speed V (km/h) are as follows:

1) when $V<4$, the pulse length is 1.75;

2) when $4 \leq V<120$, the pulse length is $1.75-(V/4)\times 0.05$; and 3) when $V \geq 120$, the pulse length is 0.25.

In FIG. 15, the imaginary area X is an imaginary area corresponding to a detection area of a vehicle detector, which is required when the traffic signal controller 11 at the intersection Ji executes the recall control on the northward approach path.

When the traffic signal controller 11 executes the recall control, it is preferable to adopt, as the imaginary area X to be stored in the roadside relay device 2, the imaginary area D corresponding to a road length (e.g., 10 to 20 m) of a measurement area of an image-processing vehicle detector used for the recall control.

For example, the storage unit 24 may be caused to store, as the area information of the recall control imaginary area X, the area information on the coordinate system of the imaginary area D corresponding to a measurement area that has a downstream end roughly matching the stop line and has an upstream end apart from the stop line by a predetermined distance within a range of 10 to 20 m.

The control unit 23 of the roadside relay device 2 which stores the imaginary area D as the recall control imaginary area X, determines whether or not a probe vehicle 5 is present in the imaginary area X (=D) on the basis of the area information of the imaginary area X (=D) and the probe information S5, and generates an imaginary pulse signal representing presence/absence of a probe vehicle 5 by means of ON/OFF.

The wired communication unit 22 of the roadside relay device 2 transmits the generated imaginary pulse signal to the traffic signal controller 11, and the traffic signal controller 11 executes the recall control by using the received imaginary pulse signal.

The recall control imaginary area X is preferably the imaginary area D corresponding to the measurement area of the image-processing vehicle detector, but may be the imaginary area A or C corresponding to a detection area of a non-image-processing vehicle detector, depending on the operational convenience or the like.

In this case, the storage unit 24 may be caused to store, as the area information of the recall control imaginary area X, the area information of the imaginary area A or C corresponding to the detection area of the non-image-processing vehicle detector, which includes a point Px about 3 to 5 m apart from the stop line of the approach path that is a subsidiary road.

The control unit 23 of the roadside relay device 2 which stores the imaginary area A or C as the recall control imaginary area X, determines whether or not a probe vehicle 5 is present in the imaginary area X (=A or C) on the basis of the area information of the imaginary area X (=A or C) and the probe information S5, and generates an imaginary pulse signal representing presence/absence of a probe vehicle 5 by means of ON/OFF.

The wired communication unit 22 of the roadside relay device 2 transmits the generated imaginary pulse signal to the traffic signal controller 11, and the traffic signal controller 11 executes the recall control by using the received imaginary pulse signal.

In FIG. 15, the imaginary area Y is an imaginary area corresponding to a detection area of a vehicle detector, which is required when the traffic signal controller 11 at the intersection Ji executes the high-speed-actuated control on the westward approach path.

When the traffic signal controller 11 executes the high-speed-actuated control, it is preferable to adopt, as the imaginary area Y to be stored in the roadside relay device 2, the imaginary area D corresponding to a road length (e.g., 30 to 50 m) of a measurement area of an image-processing vehicle detector used for the high-speed-actuated control.

For example, the storage unit 24 may be caused to store, as the area information of the imaginary area Y for high-speed-actuated control, the area information of the imaginary area D corresponding to the measurement area having the above-mentioned road length (e.g., 30 to 50 m) and including a point Py apart from the stop line by a predetermined distance (e.g., 400 to 600 m).

The control unit 23 of the roadside relay device 2 which stores the imaginary area D as the imaginary area Y for high-speed-actuated control, calculates the average speed of a probe vehicle 5 in a predetermined distance from entry into the imaginary area Y (=D) to exit therefrom, on the basis of the area information of the imaginary area Y (=D) and the probe information S5. The control unit 23 regards the calculated average speed as the vehicle speed at the point Py.

The wired communication unit 22 of the roadside relay device 2 transmits the calculated vehicle speed at the point Py to the traffic signal controller 11, and the traffic signal controller 11 executes the high-speed-actuated control by using the received vehicle speed.

The imaginary area Y for high-speed-actuated control is preferably the imaginary area D corresponding to the measurement area of the image-processing vehicle detector, but may be the imaginary area C corresponding to a detection area of a non-image-processing vehicle detector, depending on the operational convenience or the like.

In this case, the storage unit 24 may be caused to store, as the area information of the imaginary area Y for high-speed-actuated control, the area information of the imaginary area C corresponding to the detection area of the non-image-processing vehicle detector, which includes the point Py apart from the stop line by a predetermined distance (e.g., 400 to 600 m).

The control unit 23 of the roadside relay device 2 which stores the imaginary area C as the imaginary area Y for high-speed-actuated control, calculates the instantaneous speed of a probe vehicle 5 at the moment when the probe vehicle 5 passes through the imaginary area Y (=C), on the basis of the area information of the imaginary area Y (=C) and the probe information S5. The control unit 23 regards the calculated instantaneous speed as the vehicle speed at the point Py.

The wired communication unit 22 of the roadside relay device 2 transmits the calculated vehicle speed at the point Py to the traffic signal controller 11, and the traffic signal controller 11 executes the high-speed-actuated control by using the received vehicle speed.

Regarding the vehicle speed (instantaneous speed) of the probe vehicle 5 at the moment of passing through the imaginary area Y, the vehicle speed included in the probe information S5 (the vehicle speed measured by the vehicle 5) may be adopted as it is, or a speed value calculated from vehicle positions and temporal information included in a plurality of pieces of probe information S5 may be adopted.

In FIG. 15, the imaginary area Z is an imaginary area corresponding to a detection area of a vehicle detector, which is required when the traffic signal controller 11 at the intersection Ji executes at least one of the bus-actuated control and the VIP-actuated control on the westward approach path.

In the case where the traffic signal controller 11 executes the bus-actuated control or the VIP-actuated control by using a detection pulse signal outputted from a non-image-processing vehicle detector, the non-image-processing vehicle detector is installed at a predetermined point apart from the stop line of the approach path by a predetermined distance (e.g., 100 to 150 m).

Therefore, it is sufficient if the imaginary area Z is an imaginary area (e.g., the imaginary area A or the imaginary area C) having a length, in the vehicle advancing direction, enough to detect passing of a vehicle 5. In addition, the coordinate values of the imaginary area Z may be set to the coordinate values corresponding to the above-mentioned predetermined point.

The roadside relay device 2 generates an imaginary pulse signal every time a probe vehicle 5 passes through the imaginary area Z (=A or C), and transmits the generated imaginary pulse signal to the traffic signal controller 11. The traffic signal controller 11 executes at least one of the bus-actuated control and the VIP-actuated control by using the received imaginary pulse signal.

In the bus-actuated control and the VIP-actuated control, the type of the vehicle 5 that has passed through the imaginary area Z is also needed. Therefore, the roadside relay device 2 transmits the vehicle type included in the received probe information S5 to the traffic signal controller 11.

In the case where the traffic signal controller 11 executes at least one of the bus-actuated control and the VIP-actuated control by using an output signal from an image-processing vehicle detector, the imaginary area D corresponding to the measurement area (having a road length of 30 to 50 m, for example) of the image-processing vehicle detector may be adopted as the imaginary area Z.

While in the example of FIG. 15, the imaginary area Z for the bus-actuated control or the VIP-actuated control is exemplified, the imaginary area Z may be applied to local-actuated control (fast emergency vehicle preemption) to allow preferential passing of an emergency vehicle (a police car, an ambulance, etc.).

In this case, when detecting entry of an emergency vehicle into the imaginary area Z on the basis of the imaginary pulse signal and the vehicle type received from the roadside relay device 2, the traffic signal controller 11 performs, for example, extension of green interval to allow preferential passing of the emergency vehicle through the intersection.

As described above, according to the roadside relay device 2 illustrated in FIG. 15, the storage unit 24 stores therein the area information of the plurality of imaginary areas (at least two of the imaginary areas Q to Z) corresponding to the detection areas, which are required for each of the types of local-actuated controls that the traffic signal controller 11 at the intersection Ji can execute, and the control unit 23 generates traffic indices for each of the plurality of pieces of area information, on the basis of the plurality of pieces of area information and the probe information S5. Therefore, the traffic indices for each of the area information of the imaginary areas Q to Z generated by the control unit 23 correspond to the traffic indices for each of the types of local-actuated controls.

In addition, the wired communication unit 22 of the roadside relay device 2 transmits the generated traffic indices for each of the local-actuated controls to the external equipment such as the traffic signal controller 11.

Therefore, only by installing one roadside relay device 2, the traffic signal controller 11 can obtain the traffic indices required for each of the plurality of types of local-actuated controls. Accordingly, even when vehicle detectors are not installed in places suitable for the respective types of local-actuated controls, the traffic signal controller 11 can execute the plurality of types of local-actuated controls.

In the explanatory diagram shown in FIG. 15, the imaginary areas Q, R, Y, and Z set on the westward approach path and the imaginary area X set on the northward approach path are illustrated. However, the approach paths on which the imaginary areas Q to Z are set are not particularly limited. That is, the imaginary areas Q to Z may be set on any approach path in any direction to be controlled by the local-actuated control that the traffic signal controller 11 executes.

[Imaginary Area Corresponding to Multiple Approach Paths]

Figure 16:
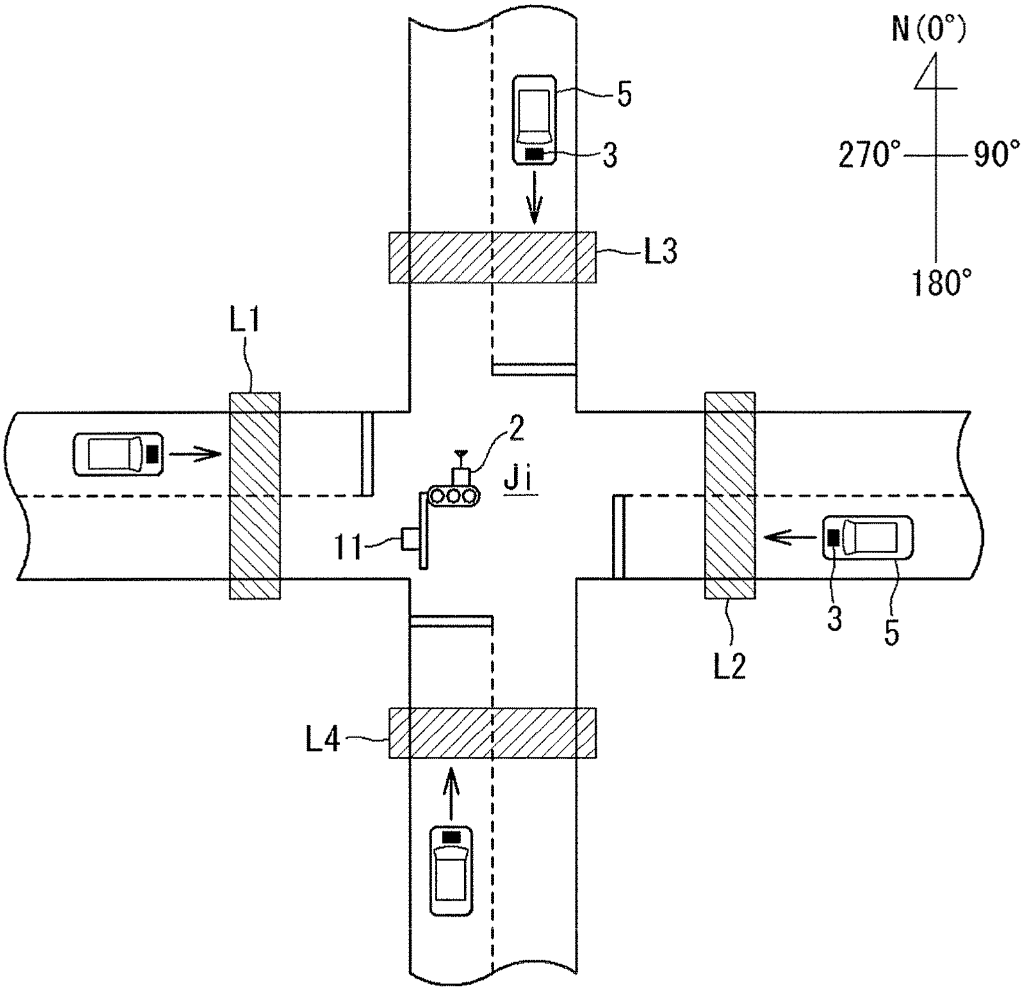
FIG. 16 is an explanatory diagram showing examples of imaginary areas set on a plurality of approach paths, respectively.

FIG. 16 is an explanatory diagram showing an example of imaginary areas L1 to L4 set on a plurality of approach paths to a single intersection Ji, respectively.

The imaginary area L1 is an imaginary area corresponding to a detection area of a vehicle detector to be installed on a eastward approach path, and the imaginary area L2 is an imaginary area corresponding to a detection area of a vehicle detector to be installed on a westward approach path.

The imaginary area L3 is an imaginary area corresponding to a detection area of a vehicle detector to be installed on a southward approach path, and the imaginary area L4 is an imaginary area corresponding to a detection area of a vehicle detector to be installed on a northward approach path.

The storage unit 24 of the roadside relay device 2 stores therein area information (coordinate values or the like) of at least two imaginary areas among the plurality of imaginary areas L1 to L4 shown in FIG. 15, which correspond to detection areas in the case where vehicle detectors are installed on a plurality of approach paths connecting to the single intersection Ji.

Figure 17A:
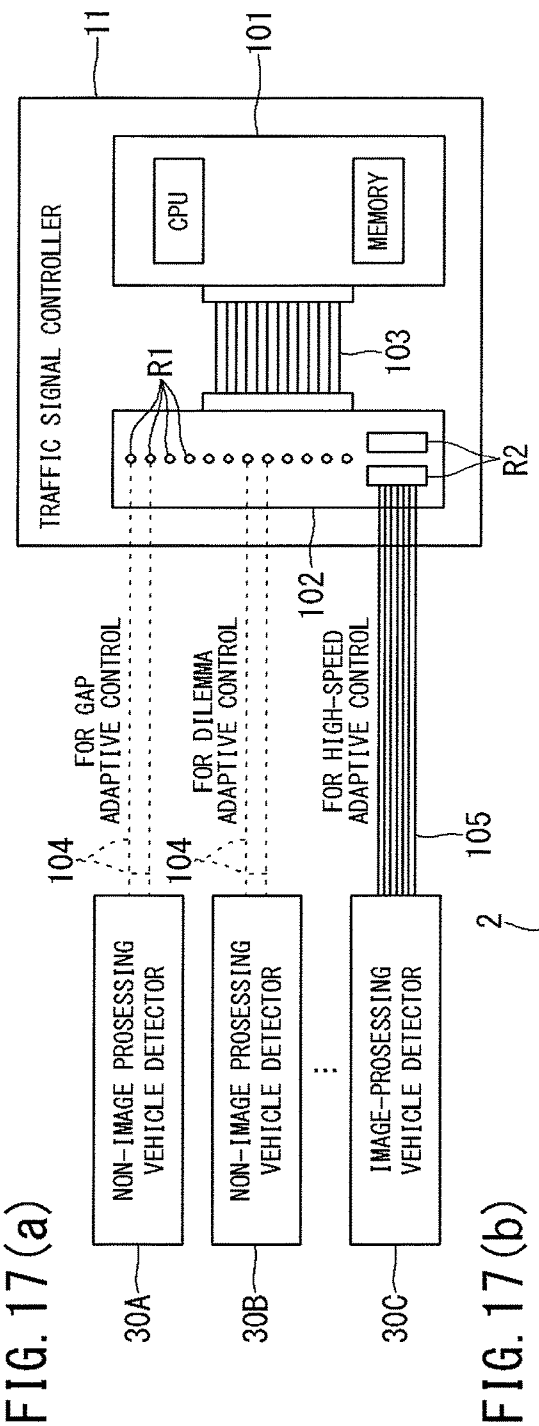
FIG. 17(*a*) is a schematic diagram showing a method for connecting a traffic signal controller and vehicle detectors, and FIG. 17(*b*) is a schematic diagram showing a method for connecting the traffic signal controller and the roadside relay device.
Figure 17B:
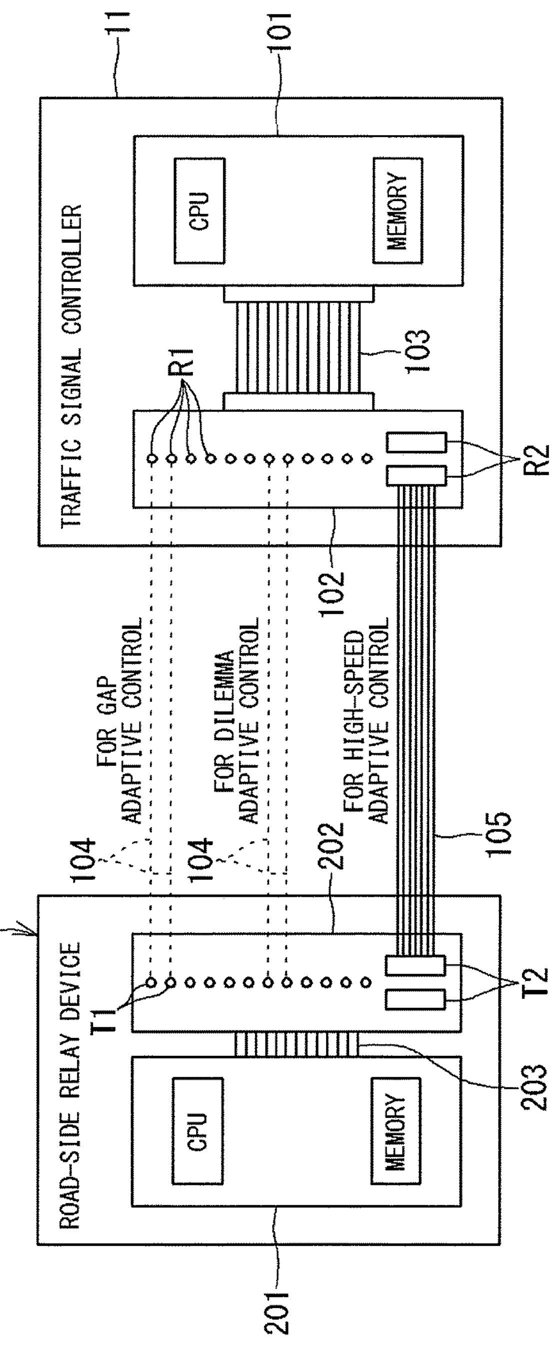

According to the roadside relay device 2 illustrated in FIG. 17, the storage unit 24 stores therein the area information of the plurality of imaginary areas (at least two of the imaginary areas L1 to L4) forming the detection areas of the plurality of approach paths, and the control unit 23 generates traffic indices for each of the plurality of pieces of area information on the basis of the plurality of pieces of area information and the probe information S5. Therefore, the traffic indices for each of the pieces of area information of the imaginary areas L1 to L4, which are generated by the control unit 23, correspond to the traffic indices for each of the approach paths.

In addition, the communication units 21, 22 of the roadside relay device 2 transmits the generated traffic indices for each of the approach paths to the external equipment (at least one of the central apparatus 4, the terminal device 6, and the traffic signal controller 11).

Therefore, only by installing one roadside relay device 2, the external equipment such as the central apparatus 4 can obtain the traffic indices (e.g., the traffic volume or the like) for each of the approach paths. Accordingly, even when vehicle detectors are not installed for the respective approach paths, the central apparatus 4 or the like can execute traffic signal control that requires traffic indices (e.g., the traffic volume) for each of the approach paths.

The coordinate values and the sizes of the imaginary areas L1 to L4 shown in FIG. 16 may be determined according to the types of traffic signal controls that the external equipment executes.

For example, in the case where the central apparatus 4 needs the traffic volumes at all the approach paths to the intersection Ji in order to perform center-actuated control regarding a predetermined road section including the intersection Ji, the center apparatus 4 may adopt the imaginary area A for traffic volume calculation illustrated in FIG. 5, as the imaginary areas L1 to L4.

Further, for example, in the case where the traffic signal controller 11 executes the gap-actuated control on the eastward and westward approach paths at the intersection Ji and executes the high-speed-actuated control on the southward and northward approach paths at the intersection Ji, the traffic signal controller 11 may adopt the imaginary area Q for gap-actuated control illustrated in FIG. 15 as the imaginary areas L1 and L2, and the imaginary area Y for high-speed-actuated control illustrated in FIG. 15 as the imaginary areas L3 and L4.

[Method for Connecting Roadside Relay Device and Traffic Signal Controller]

FIG. 17(*a*) is a schematic diagram showing a method for connecting the traffic signal controller 11 and the vehicle detectors 30A to 30C. FIG. 17(*b*) is a schematic diagram showing a method for connecting the traffic signal controller 11 and the roadside relay device 2.

As shown in FIG. 17, the traffic signal controller 11 includes, in a housing, a control substrate 101 on which a CPU and a memory are mounted, and a terminal block 102 for wiring to other equipment. The control substrate 101 and the terminal block 102 are connected to each other via a flat cable 103.

The terminal block 102 includes: a plurality of reception ports R1 to which single-wire cables 104 formed of insulated wires or the like are connected; and a plurality of reception ports R2 to which a connector of a line concentrating cable 105 formed of a flat cable or the like is connected.

The types of local-actuated controls are assigned to the plurality of reception ports R1 and R2 of the terminal block 102. For example, in the example of FIG. 17, the first and second reception ports R1 from the top are reception ports for a detection pulse signal used in the gap-actuated control.

The seventh and eighth reception ports R1 from the top are reception ports for a detection pulse signal used in the dilemma-actuated control. The left-side reception port R2 is a reception port for a vehicle speed used in the high-speed-actuated control.

Therefore, as shown in FIG. 17(*a*), the non-image-processing vehicle detector 30A for gap-actuated control is connected to the first and second reception ports R1 from the top via the single-wire cable 104, and the non-image-processing vehicle detector 30B for dilemma-actuated control is connected to the seventh and eighth reception ports R1 from the top via the single-wire cable 104.

Further, the image-processing vehicle detector 30C for high-speed-actuated control is connected to the left-side reception port R2 via the line concentrating cable 105.

As shown in FIG. 17(*b*), the roadside relay device 2 includes, in a housing, a control substrate 201 on which a CPU and a memory are mounted, and a terminal block 202 for wiring to other equipment. The control substrate 201 and the terminal block 202 are connected to each other via a flat cable 203.

The same hardware interface as that of the terminal block 102 of the traffic signal controller 11 is adopted for the terminal block 202 of the roadside relay device 2. The terminal block 202 includes: a plurality of transmission ports T1 to which single-wire cables 104 formed of insulated wires or the like are connected; and a plurality of transmission ports T2 to which a connector of a line concentrating cable 105 formed of a flat cable or the like is connected.

The types of local-actuated controls are assigned to the plurality of transmission ports T1 and T2 of the terminal block 202. For example, in the example of FIG. 17(*b*), the first and second transmission ports T1 from the top are transmission ports for a detection pulse signal used in the gap-actuated control.

The seventh and eighth transmission ports T1 from the top are transmission ports for a detection pulse signal used in the dilemma-actuated control, and the right-side transmission port T2 is a transmission port for a vehicle speed used in the high-speed-actuated control.

Therefore, as shown in FIG. 17(*b*), the transmission ports T1 for gap-actuated control are connected to the reception ports R1 (first and second reception ports R1 from the top) of the same use via the single-wire cables 104, and the transmission ports T1 for dilemma-actuated control are connected to the reception ports R1 (seventh and eighth reception ports R1 from the top) of the same use via the single-wire cables 104.

Further, the transmission port T2 for high-speed-actuated control is connected to the reception port R2 (left-side reception port R2) of the same use via the line concentrating cable 105.

The CPU of the roadside relay device 2 determines from which of the transmission ports T1 and T2 the traffic index generated by the roadside relay device 2 should be transmitted, according to the type of local-actuated control.

Specifically, in the case where the traffic index to be transmitted is a vehicle speed generated by using the imaginary area Q for gap-actuated control, the CPU outputs the vehicle speed from the transmission ports T1 for gap-actuated control (first and second transmission ports T1 from the top).

Likewise, in the case where the traffic index to be transmitted is an imaginary pulse signal generated by using the imaginary area R for dilemma-actuated control, the CPU outputs the imaginary pulse signal from the transmission ports T1 for dilemma-actuated control (seventh and eighth transmission ports T1 from the top).

Further, in the case where the traffic index to be transmitted is a vehicle speed generated by using the imaginary area Y for high-speed-actuated control, the CPU outputs the vehicle speed from the transmission port T2 for high-speed-actuated control (right-side transmission port T2).

As described above, the roadside relay device 2 shown in FIG. 17 adopts the terminal block 202 having the same hardware interface as the terminal block 101 of the traffic signal controller 11, and therefore is provided with the transmission ports T1 and T2 corresponding to the reception ports R1 and R2, for the respective uses, included in the traffic signal controller 11. Therefore, the roadside relay device 2 can be communicably connected to the traffic signal controller 11 without the necessity of changing the hardware interface for external connection which is adopted by the existing traffic signal controller 11.

Figure 18:
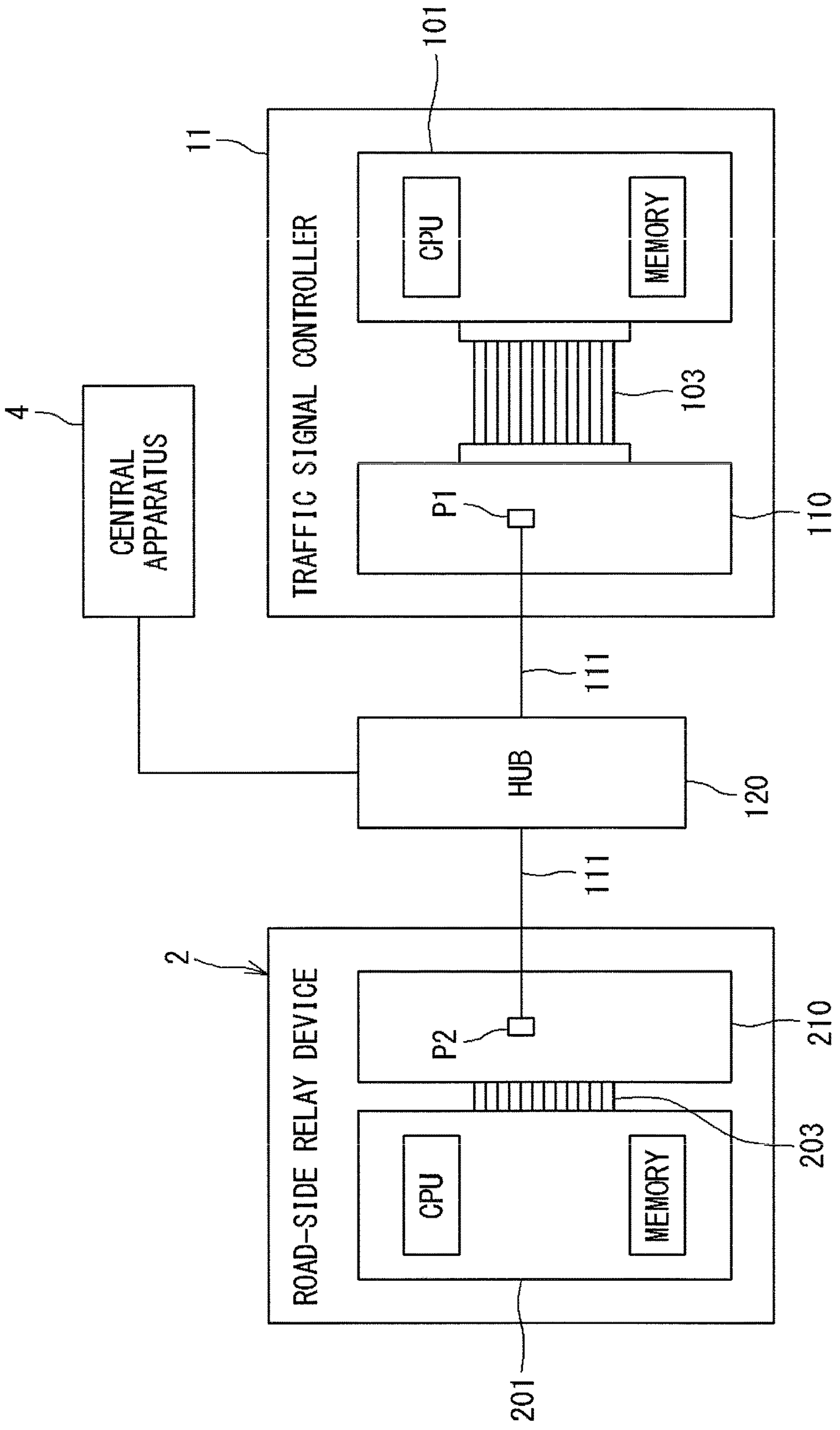
FIG. 18 is a schematic diagram showing another method for connecting the traffic signal controller and the roadside relay device.

FIG. 18 is a schematic diagram showing another method for connecting the traffic signal controller 11 and the roadside relay device 2.

In the connection method shown in FIG. 18, for example, a LAN connection method that conforms to the Ethernet (registered trademark) is adopted as a connection method regarding wired communication between the traffic signal controller 11 and the roadside relay device 2.

As shown in FIG. 18, the traffic signal controller 11 includes, in a housing, a control substrate 101 on which a CPU and a memory are mounted, and a reception unit 110 for wiring to other equipment. The control substrate 101 and the reception unit 110 are connected to each other via a flat cable 103.

The reception unit 110 includes one LAN port P1 to which a LAN cable 111 is connected, and is connected, via the LAN cable 111, to a switching hub 120 including an L3 switch or the like.

The roadside relay device 2 includes, in a housing, a control substrate 201 on which a CPU and a memory are mounted, and a transmission unit 210 for wiring to other equipment. The control substrate 201 and the transmission unit 210 are connected to each other via a flat cable 203.

The transmission unit 210 of the roadside relay device 2 includes one LAN port P2 to which a LAN cable 111 is connected, and is connected, via the LAN cable 111, to a switching hub 120 including an L3 switch or the like.

The switching hub 120 includes a plurality of LAN ports (not shown). LAN cables 111 connected to two of the LAN ports are connected to the reception unit 110 and the transmission unit 210, respectively, while a LAN cable 111 connected to another one LAN port is connected to a roadside device of a relay device 4 or the like via a router (not shown).

The CPU of the roadside relay device 2 stores, in an Ethernet frame, a traffic index generated by the roadside relay device 2, and causes the transmission unit 210 to transmit the Ethernet frame. The destination of the Ethernet frame is determined according to the kind of the traffic index to be transmitted.

Specifically, in the case where the traffic index to be transmitted is an imaginary pulse signal generated by using the imaginary area Q for gap-actuated control, the CPU sets the destination of the Ethernet frame including the imaginary pulse signal, to the traffic signal controller 11.

Likewise, also in the case where the traffic index to be transmitted is a vehicle speed generated by using the imaginary area R for dilemma-actuated control, the CPU sets the destination of an Ethernet frame including the vehicle speed, to the traffic signal controller 11.

Further, also in the case where the traffic index to be transmitted is a vehicle speed generated by using the imaginary area Y for high-speed-actuated control, the CPU sets the destination of an Ethernet frame including the vehicle speed, to the traffic signal controller 11.

In the case where the traffic index generated by the roadside relay device 2 is information (e.g., the traffic volume counted by using the imaginary area A) to be transmitted to the central apparatus 4, the CPU of the roadside relay device 2 sets the destination of an Ethernet frame including the traffic index, to the central apparatus 4.

As described above, the roadside relay device 2 shown in FIG. 18 is connected to the traffic signal controller 11 that conforms to the Ethernet standard, via the LAN cables 111 and the switching hub 120. Therefore, as compared to the case where the roadside relay device 2 and the traffic signal controller 11 are connected in parallel via a plurality of communication cables that depend on the types of local-actuated controls (the case of FIG. 17(*b*)), the wiring structure is simplified, which advantageously facilitates the connection work between the roadside relay device 2 and the traffic signal controller 11.

[Outline of Detector Emulation]

"Detector emulation (FIG. 19)" includes: inputting, to the traffic signal controller 11, a pseudo pulse signal generated from probe information by the roadside relay device 2; and causing the traffic signal controller 11 to execute signal control similar to that to be executed at an intersection Jk where a vehicle detector is installed.

Examples of input information used for the detector emulation include: traffic light switching timing at the present time at the intersection Jk; probe information; and the like. Output information of the detector emulation is a pseudo pulse signal, and the destination thereof is the traffic signal controller 11.

Figure 19:
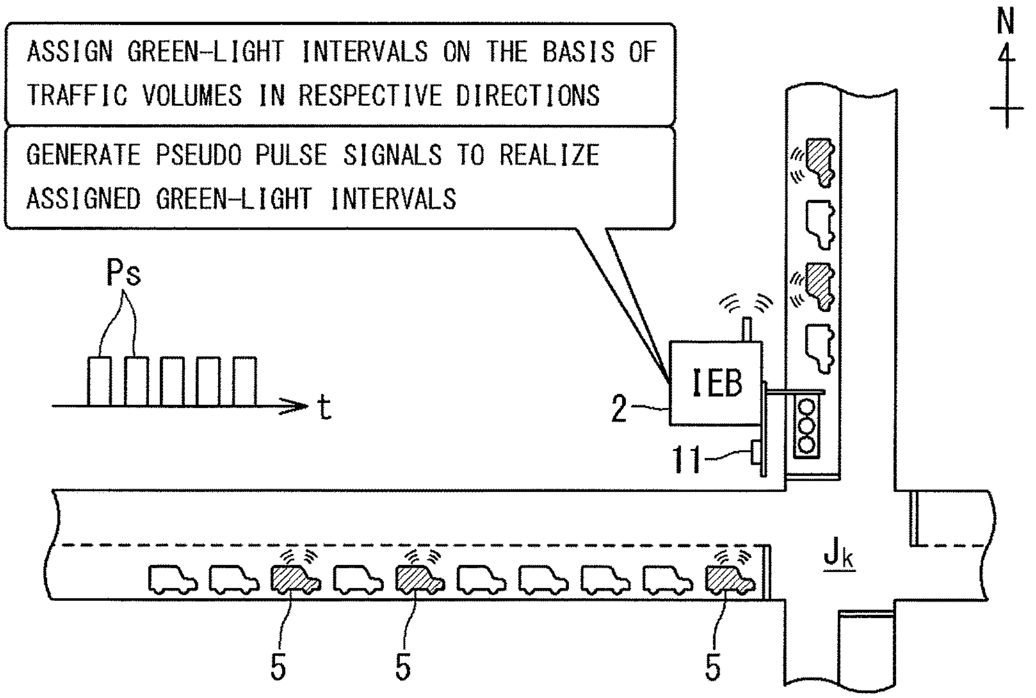
FIG. 19 is an explanatory diagram showing the outline of detector emulation.

FIG. 19 is an explanatory diagram showing the outline of the detector emulation.

In FIG. 19, it is assumed that a roadside detector composed of a vehicle detector for detecting vehicles in a detection area has not yet been installed at an intersection Jk. A reference character Ps in FIG. 19 indicates a pseudo pulse signal that the roadside relay device 2 can generate.

Further, it is also assumed that, at the intersection Jk shown in FIG. 19, the traffic signal controller 11 is able to perform switching between pattern control not accompanied by dynamic change of green interval, and local-actuated control, such as gap-actuated control, accompanied by extension of green interval.

Even when the traffic signal controller 11 is able to perform switching between the pattern control and the local-actuated control, a roadside detector such as a vehicle detector needs to be installed at each of the approach paths of the intersection Jk in order to realize the local-actuated control.

However, in order to install such vehicle detectors on a road, it is necessary to erect a support strut on each approach path, and mount a detector head, for each lane, to a beam member provided at an upper end of the support strut. This work may result in an increase in costs for installation of support struts and the like, and the vehicle detector may adversely affect the scenery around the intersection.

Further, since the work for installing the support struts needs to be redone when detection points of the installed vehicle detector are adjusted, there is also a problem that it is difficult to adjust the detection points.

Meanwhile, the roadside relay device 2 estimates the traffic volume on each of the approach paths in the respective directions by using probe information received from equipped vehicles 5 (vehicles equipped with the on-vehicle communication apparatus 3) traveling on the approach paths, and determines green-light intervals to be assigned to the respective approach paths, on the basis of the estimated traffic volumes.

Then, the roadside relay device 2 generates a plurality of pseudo pulse signals Ps to realize the assigned green-light intervals, and transmits the generated pseudo pulse signals Ps to the traffic signal controller 11.

Therefore, the traffic signal controller 11 is allowed to execute switching between the pattern control and the local-actuated control on the basis of the pseudo pulse signals Ps received from the roadside relay device 2. Accordingly, even when vehicle detectors are not installed on the approach paths at the intersection Jk, the traffic signal controller 11 can execute switching of the control.

[Other Modifications]

It is noted that the embodiment disclosed herein is merely illustrative in all aspects and should not be recognized as being restrictive. The scope of rights of the present invention is not limited to the embodiment described above, and includes all the configurations disclosed in the scope of the claims and all modifications within an equivalent scope.

For example, in the embodiment (including the modifications) described above, the roadside relay device 2 has the function of the traffic index generation device. However, an ITS radio set may be equipped with the function of the traffic index generation device.

In addition, the central apparatus 4 may collect the probe information S5 within the area that the central apparatus 4 covers, and may be equipped with the function of the traffic index calculation device of the present embodiment.

REFERENCE SIGNS LIST

1 traffic signal unit
2 roadside relay device (traffic index generation device)
3 on-vehicle communication apparatus
4 central apparatus
5 vehicle (probe vehicle)
5A standard-size vehicle
5B large-size vehicle
6 terminal device
7 communication line
9 router
10 signal light unit
11 traffic signal controller
12 signal control line
20 antenna
21 wireless communication unit
22 wired communication unit
23 control unit
23A data relay unit
23B information processing unit
24 storage unit
30 antenna
31 communication unit
32 control unit
33 storage unit
61 control unit
62 communication unit
63 storage unit
64 display unit
65 loudspeaker
66 operation unit
101 control substrate
102 terminal block
103 flat cable
104 single-wire cable
105 line concentrating cable
110 reception unit
111 LAN cable
120 switching hub
201 control substrate
202 terminal block
203 flat cable
210 transmission unit

The invention claimed is:

1. A traffic index generation device configured to generate a traffic index used for traffic signal control, the device comprising:

a storage unit configured to store therein area information on a coordinate system, the area information forming a detection area, assuming that a vehicle detector is installed on a road;

a communication unit configured to receive probe information including a vehicle position and temporal information of a traveling vehicle; and a control unit configured to generate the traffic index on the basis of the area information and the probe information.

2. The traffic index generation device according to claim 1, wherein the storage unit stores therein a plurality of pieces of the area information that form a plurality of the detection areas located at different positions on the road, respectively, and the control unit generates the traffic index for each of the stored plurality of pieces of the area information.

3. The traffic index generation device according to claim 1, wherein the storage unit stores therein a plurality of pieces of the area information that form a plurality of the detection areas on a plurality of approach paths connecting to a single intersection, respectively.

4. The traffic index generation device according to claim 1, wherein the traffic index generated by the control unit includes at least one of a traffic volume, an occupancy, and a detection pulse signal of the vehicle in the detection area.

5. The traffic index generation device according to claim 2, wherein the storage unit stores therein the plurality of pieces of the area information that form the plurality of the detection areas corresponding to different types of local-actuated controls, respectively.

6. The traffic index generation device according to claim 5, wherein the traffic index generated by the control unit includes at least one of a detection pulse signal in the detection area, and a vehicle speed in the detection area.

7. The traffic index generation device according to claim 5, wherein the probe information includes a type of the vehicle, and the control unit causes the communication unit to transmit the vehicle type included in the probe information to the traffic signal controller.

8. The traffic index generation device according to claim 1, wherein the probe information includes a vehicle heading, and the control unit does not generate the traffic index when an angular difference between the vehicle heading and a road heading exceeds a predetermined value, and generates the traffic index when the angular difference is less than or equal to the predetermined value.

9. The traffic index generation device according to claim 1, wherein an area on the coordinate system, which is specified by the area information, extends two-dimensionally or three-dimensionally.

10. The traffic index generation device according to claim 1, wherein the communication unit is able to receive the area information from external equipment, and the control unit causes the storage unit to store the area information received by the communication unit.

11. The traffic index generation device according to claim 1, wherein the communication unit is able to receive the area information from external equipment, and the control unit updates the area information stored in the storage unit, to the area information received by the communication unit.

12. The traffic index generation device according to claim 11, wherein the control unit causes the communication unit to transmit the area information before being updated and the area information after being updated.

13. The traffic index generation device according to claim 1, wherein the probe information includes at least one of information about a length of the vehicle and information about a type of the vehicle, and the control unit executes, by using the information, a process of correcting the position of the vehicle to at least one of a front end position of the vehicle and a rear end position of the vehicle.

14. The traffic index generation device according to claim 1, wherein, in a case where the control unit generates a plurality of kinds of the traffic indices, the control unit determines, for each of the kinds of the traffic indices, whether or not to cause the communication unit to transmit the traffic index.

15. The traffic index generation device according to claim 1, wherein in a case where the control unit generates a plurality of kinds of the traffic indices, the control unit determines, for each of kinds of external equipment as a transmission destination, the kind of the traffic index to be transmitted by the communication unit.

16. A non-transitory computer readable storage medium storing a computer program for causing a computer to function as a device configured to generate a traffic index used for traffic signal control, the computer program comprising:

a step of causing a storage unit of the traffic index generation device to store area information on a coordinate system, the area information forming a detection area, assuming that a vehicle detector is installed on a road;

a step of causing a communication unit of the traffic index generation device to receive probe information including a vehicle position and temporal information of a traveling vehicle; and a step of causing a control unit of the traffic index generation device to generate the traffic index on the basis of the area information and the probe information.

17. A traffic index generation method executed by a device configured to generate a traffic index used for traffic signal control, the method comprising:

a step of causing a storage unit of the traffic index generation device to store area information on a coordinate system, the area information forming a detection area, assuming that a vehicle detector is installed on a road;

a step of causing a communication unit of the traffic index generation device to receive probe information including a vehicle position and temporal information of a traveling vehicle; and a step of causing a control unit of the traffic index generation device to generate the traffic index on the basis of the area information and the probe information.

* * * * *